United States Patent
Maeda et al.

(10) Patent No.: US 6,526,822 B1
(45) Date of Patent: Mar. 4, 2003

(54) FLOW RATE AND FLOW VELOCITY MEASUREMENT DEVICE

(75) Inventors: Shunsuke Maeda, Aichi (JP); Yoshihiko Kohmura, Aichi (JP); Takio Kojima, Aichi (JP); Yasuhisa Kuzuya, Aichi (JP); Masanori Suda, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/679,565

(22) Filed: Oct. 6, 2000

(30) Foreign Application Priority Data

Oct. 6, 1999 (JP) ............................................ 11-285650

(51) Int. Cl.[7] .................................................. G01F 1/68
(52) U.S. Cl. .................................................. 73/204.21
(58) Field of Search ...................... 73/202.5, 204.21, 73/202.22, 204.12, 204.11

(56) References Cited

U.S. PATENT DOCUMENTS

| 4,457,169 A |   | 7/1984 | Lauterbach et al. |
|---|---|---|---|
| 4,709,581 A |   | 12/1987 | Nishimura et al. |
| 5,467,648 A | * | 11/1995 | Igarashi et al. ............. 73/202.5 |
| 5,537,870 A | * | 7/1996 | Zurek et al. .................... 73/202 |
| 5,563,340 A | * | 10/1996 | Clowater et al. ........... 73/202.5 |
| 5,804,718 A | * | 9/1998 | Nagasaka et al. ............. 73/202 |
| 5,948,975 A | * | 9/1999 | Mueller et al. ............ 73/118.2 |
| 6,220,090 B1 | * | 4/2001 | Kohno et al. .................. 73/202 |

FOREIGN PATENT DOCUMENTS

| DE | 198 00 573 | 7/1999 |
|---|---|---|
| EP | 0 369 592 | 5/1990 |
| JP | 3-67128 | 3/1991 |
| JP | 8-193863 | 7/1996 |

OTHER PUBLICATIONS

European Search Report No. 308766 dated Feb. 12, 2001.

\* cited by examiner

Primary Examiner—Hezron Williams
Assistant Examiner—Lilybett Martir
(74) Attorney, Agent, or Firm—Sughrue Mion, PLLC

(57) ABSTRACT

A flow measurement device is disclosed, in which an accumulation of pollution substance onto a detection element is prevented, and which can measure a reverse flow similarly to a normal flow. On both ends of an outer wall 23 outer peripheral portion of a divided flow pipe 20 having a Ω-shape pipe passage, there are oppositely formed an inlet port 25 and an outlet port 26, which open in faces orthogonal to a flow direction of a main flow M that is a detection object. Within the divided flow pipe 20, by a curved partition 27, plural branch flow passages 28a, 28b mutually branching and joining in the divided flow pipe 20 are formed. Inside both end portions of the outer wall 23, undulation portions 32, 33 are formed so as to clog an inlet and an outlet of the outer peripheral side branch flow passage 28a and, by this, throttles are formed respectively in a flow passage between the inlet port 25 and the inlet of the branch flow passage 28a and a flow passage between the outlet port 26 and the outlet of the branch flow passage 28a. In a bottom portion of the outer wall 23 of the divided flow pipe 20, a detection element 31 is attached so as to be exposed to a flow in the outer peripheral side branch flow passage 28a and, against its detection face, a down flow DW further divided from a divided flow D obliquely impinges.

25 Claims, 13 Drawing Sheets

FLOW RATE AND FLOW VELOCITY MEASUREMENT DEVICE

BACKGROUND OF THE INVENTION

1. Field of the Invention

The present invention relates to a device for measuring various quantities concerning a flow, among others, relates to a flow rate and flow velocity measurement device using a detection element integrally formed on a detection element and/or a semiconductor chip depending on temperature, and relates to a measurement device suitably applied, for example, as a combustion controlling mass flow rate sensor of an engine for a vehicle or industry, or a mass flow rate sensor for an industrial air conditioning system and compressor pressurized air supply system and, furthermore, an air/fuel ratio controlling flow rate sensor of a domestic gas hotplate.

2. Description of the Related Art

In an engine combustion controlling mass flow rate sensor for a vehicle, an output change due to a pollution substance accumulation onto a detection element is a great problem. In order to solve this problem, in Japanese Patent Laid-Open No. 193863/1996 Gazette and the like there is proposed "to prevent an accumulation of pollution substance onto and an action of reverse flow on the detection element by providing a housing structure with an auxiliary passage for deflecting a part of air from a main air flow and a suitable opening portion".

However, the housing structure of a sensor disclosed in the Japanese Patent Laid-Open No. 193863/1996 Gazette is effective for accumulation prevention of a pollution substance whose density is much higher than that of a measurement fluid but, as to the pollution substance whose density is relatively low, there is a fear that it enters into a divided flow passage and is accumulated onto the detection element. Further, in this sensor, since it is excessively intended to exclude an influence of the reverse flow, it becomes difficult to measure the reverse flow.

By the way, recently, in order to cope with an emission regulation and the like, there is desired a further high performance combustion controlling mass flow rate sensor, for example, a sensor capable of detecting both of normal flow and reverse flow. Incidentally, hitherto, also a flow passage structure of the sensor capable of detecting the reverse flow has been proposed but, in the case where the reverse flow is measured, a detection output of the same level as the normal flow has not been obtained, so that it is considered that a detection output correction by a control circuit is necessary.

SUMMARY OF THE INVENTION

An object of the invention is to provide a measurement device concerning a flow, in which an accumulation of the pollution substance onto the detection element is prevented. A further object of the invention is to provide a measurement device concerning a flow, which is capable of measuring the reverse flow similarly to the normal flow.

A measurement device of a first aspect of the invention has: a divided flow pipe which has a divided flow pipe passage basically curved in $\Omega$-shape form, and into which a flow in a main flow pipe, that is a detection object, is introduced; an inlet port of the divided flow pipe, which is formed in an outer peripheral side of the divided flow pipe, and opens in a face approximately orthogonal to a flow direction in the main flow pipe; a partition formed in the divided flow pipe; plural branch flow passages divided/formed by the partition so as to mutually branch and join in the divided flow pipe; and a detection element which is disposed so as to be exposed to a flow in, among the plural branch flow passages, the branch flow passage formed in the outer peripheral side of the divided flow pipe, and detects a quantity concerning the flow.

In this measurement device, in the divided flow pipe, a measurement fluid introduced into the divided flow pipe is sharply changed in its direction before it arrives an inlet of the branch flow passage in which the detection element exists. Therefore, the pollution substance whose inertia is high is prevented from entering into the branch flow passage in which the detection element exists. In addition, in the divided flow pipe, by means of further dividing the flow by the partition, it is possible to reduce a Reynolds number of the flow toward the detection element (because a flow sectional area becomes small), so that the flow in the vicinity of the detection element is adjusted and it is possible to perform a high accuracy detection. That is, according to this measurement device, by effectively branching the measurement fluid and changing it in its direction, in regard to both of the pollution substance mixed in the measurement fluid whose density is higher than that of the measurement fluid and the pollution substance whose density is relatively low, these pollution substances are all prevented from accumulating on a detection face of the detection element, so that there is provided a measurement device which is excellent in pollution resistance and whose detection output change is low over a long period.

In a measurement device of a second aspect of the invention, the divided flow pipe has a flow passage structure basically symmetrical with the detection element being made a center. According to the flow passage structure of such a symmetrical structure, since the flow in a divided flow pipe passage for the normal flow and the flow in the divided flow pipe passage for the reverse flow become symmetrical, it becomes unnecessary to particularly compensate a detection output in case of the reverse flow.

Preferably, by constituting the measurement device on the basis of the first and second aspects, as well as being excellent in pollution resistance, a similar detection output level can be obtained in regard to both of the normal flow and the reverse flow.

A measurement device of a third aspect of the invention has: a detection element which is disposed so as to be exposed to a flow in, among the plural branch flow passages, the branch flow passage formed in an inner peripheral side or an intermediate portion of the divided flow pipe, and detects a quantity concerning the flow; and a throttle formed in a flow passage between an inlet port of the divided flow pipe and an inlet of the branch flow passage in which a detection face of the detection element is exposed to the flow therein. In this manner, in case where the detection element is exposed to the branch flow passage of the inner peripheral side or the intermediate portion in which a direction change of the flow introduced into the divided flow pipe inlet port is relatively small in comparison with the branch flow passage of the outer peripheral side, the accumulation of the pollution substance onto the detection element is suitably prevented by providing the throttle.

A measurement device of a fourth aspect of the invention has: a divided flow pipe which has a divided flow pipe passage basically curved in $\Omega$-shape form, and into which a flow in a main flow pipe, that is a detection object, is introduced; an inlet port of the divided flow pipe, which is formed in an one end outer peripheral side of the divided flow pipe passage, and opens in a face approximately orthogonal to a flow direction in the main flow pipe; an outlet port of the divided flow pipe, which is formed in the other end top of the divided flow pipe passage, and opens in a face approximately parallel to a flow direction in the main flow pipe; a partition which is formed in the divided flow pipe, one end of which extends till a vicinity of the inlet port, and the other end of which extends while being spaced from the outlet port; plural branch flow passages divided/formed by the partition so as to mutually branch and join in the divided flow pipe; and a detection element which is disposed so as to be exposed to a flow in, among the plural branch flow passages, the branch flow passage formed in an outer peripheral side of the divided flow pipe, and detects a quantity concerning the flow. Since this measurement device has an asymmetrical flow passage structure, it is suitable especially in case of measuring the normal flow.

A measurement device of a fifth aspect of the invention has an inlet port of the divided flow pipe and an inlet of the branch flow passage, which are mutually formed such that the flow introduced into the divided flow pipe is changed in its direction and flows into the branch flow passage in which the detection element is exposed to the flow therein.

A measurement device of a sixth aspect of the invention has a throttle formed in a flow passage between the inlet port of the divided flow pipe and an inlet of the branch flow passage such that the flow introduced into the divided flow pipe is changed in its direction and flows into the branch flow passage in which the detection element is exposed to the flow therein.

A measurement device of a seventh aspect of the invention has a Venturi provided, on a wall face of the partition opposite to the detection element and from an upstream to a downstream of the detection element, such that a flow passage of the branch flow passage in which the detection element is disposed is made narrowest in the vicinity of a center of the detection element.

Other aspects and characteristics of the invention are as set forth in each claim and, with its citation, a repetitionary description is omitted. Therefore, it is deemed that each characteristic of each claim is set forth here. Incidentally, a dependent claim can be applied respectively to each independent claim so long as it is not contrary to a principle of the invention set forth in each independent claim and, further, the dependent claim can be applied to another dependent claim.

Hereunder, preferred implementation modes of the invention are explained.

In the preferred implementation mode of the invention, an end portion of the partition does not extend to just below the inlet port of the divided flow pipe, and an inlet of the outer peripheral side branch flow passage in which the detection element is exposed to the flow therein does not open just below the inlet port of the divided flow pipe. By this, the pollution substance is prevented from advancing straight from the divided flow pipe inlet port toward the branch flow passage inlet.

In the preferred implementation mode of the invention, there is formed a bypass flow passage short-circuiting between the inlet port and the outlet port of the divided flow pipe without passing through the plural branch flow passages. By this, the flow introduced into the divided flow pipe is stabilized and, further, the measurement fluid (flow in the main flow pipe) becomes easy to be taken into the divided flow pipe. Especially, in case where the flow passage structure of the divided flow pipe is formed symmetrically with the detection element being made a center, by providing an orifice reducing the bypass flow passage or a flow sectional diameter of the bypass flow passage, it is possible to intend to stabilize the flow reaching the detection element in regard to both of the normal flow and the reverse flow.

In the preferred implementation mode of the invention, the orifice is provided in the bypass flow passage, and a flow rate of the measurement fluid toward the detection element is set by a protrusion amount of a flow passage wall forming the orifice or an orifice open area. By this, it is possible to quantitatively control the flow rate toward the detection element.

In the preferred implementation mode of the invention, in the divided flow pipe, there is provided means for forming such a flow as obliquely impinging against a detection face of the detection element. By this flow control means, a flow to be detected is constantly supplied to the detection face of the detection element, so that it is considered that it follows that the flow to be detected surely flows on the detection face. In addition, since generations of vortex flow and exfoliation in the vicinity of the detection face are suppressed, it is considered that a detection accuracy and a reproducibility are improved.

In the preferred implementation mode of the invention, as the flow control means for forming a flow (down flow) obliquely impinging against the detection face of the detection element or a flow flowing obliquely with respect to the detection face, there is provided a flow passage face protruding than the detection face in at least an upstream, or an upstream and/or a downstream of the detection element. As a form of the protrusion, one capable of forming the flow obliquely impinging against the detection face suffices and, preferably, it is protruded concavely or convexly or its protruding surface is made a linear, polygonal or concave curved form slant face.

In the preferred implementation mode of the invention, in a curved portion of the divided flow pipe (detection pipe), the detection face of the detection element is exposed inside the divided flow pipe. Further preferably, a curved pipe (divided flow pipe) is attached in a direction orthogonal to the main flow pipe (measurement object pipe), and the detection element is provided in this curved portion (folded portion, a portion where the flow passage is curved) of the curved pipe. Alternatively, the detection element is disposed in a portion where the flow in the divided flow pipe is inverted or a portion where the flow direction is sharply changed or its vicinity. Also preferably, the detection face of the detection element is exposed to a portion where the flow in the divided flow pipe is speedy. Also preferably, the detection face of the detection element is exposed to a portion where the flow is throttled and subsequently changed in its direction in the divided flow pipe or its vicinity.

In the preferred implementation mode of the invention, such a detection element as mentioned below is used. That is, this detection element is one in which basically four thin film resistors are provided in a semiconductor chip. More concretely, a diaphragm portion and a rim portion are provided on a semiconductor layer. In the diaphragm portion, there are provided (1) an upstream temperature sensor, (2) a downstream temperature sensor, and (3) a heater disposed between the upstream temperature sensor. On the other hand, in the rim portion, (4) an atmosphere temperature sensor is provided. The diaphragm portion is made very thin and a heat insulation is intended.

Next, a principle of detecting various quantities concerning a flow such as flow velocity and flow rate by using this detection element is shown as follows.

(1) An electric power supplied to the heater is controlled such that the heater has a constant temperature difference with respect to an atmosphere temperature.

(2) Accordingly, in the case where there is no flow, temperatures of the upstream temperature sensor and the down stream temperature sensor are approximately the same.

(3) However, in the case where there is flow, the temperature of the upstream temperature sensor descends because a heat escapes from its surface. As to the temperature of the downstream temperature sensor, since a heat input from the heater increases, a temperature change is smaller than that of the upstream temperature sensor. Incidentally, there is also a case where the temperatures of the downstream temperature sensor ascends.

(4) On the basis of a temperature difference between the upstream temperature sensor and the downstream temperature sensor, the flow rate and the flow velocity etc. are detected and, from a sign of the temperature difference, a flow direction is detected. Incidentally, the temperature difference can be detected on the basis of a change in electrical resistance by the temperature.

In the preferred implementation mode of the invention, it is one for, on the basis of temperature, measuring the quantity concerning a flow, at least including a flow rate and/or a flow velocity by the detection element.

In the preferred implementation mode of the invention, the measurement device according to the invention is installed in an intake system of engine of various vehicles, and can be applied to a measurement of intake quantity etc. of the engine mounted on a two-wheel or four-wheel vehicle. For example, the measurement device according to the invention is installed between an air cleaner and a throttle valve in the intake system of engine mounted on the four-wheel vehicle. Further, the measurement device according to the invention is attached, in the intake system of engine mounted on the two-wheel vehicle, to a two-wheel vehicle intake pipe (air funnel) connected to a cylinder in order to measure a flow rate or a flow velocity etc. of the intake.

Figure 1:
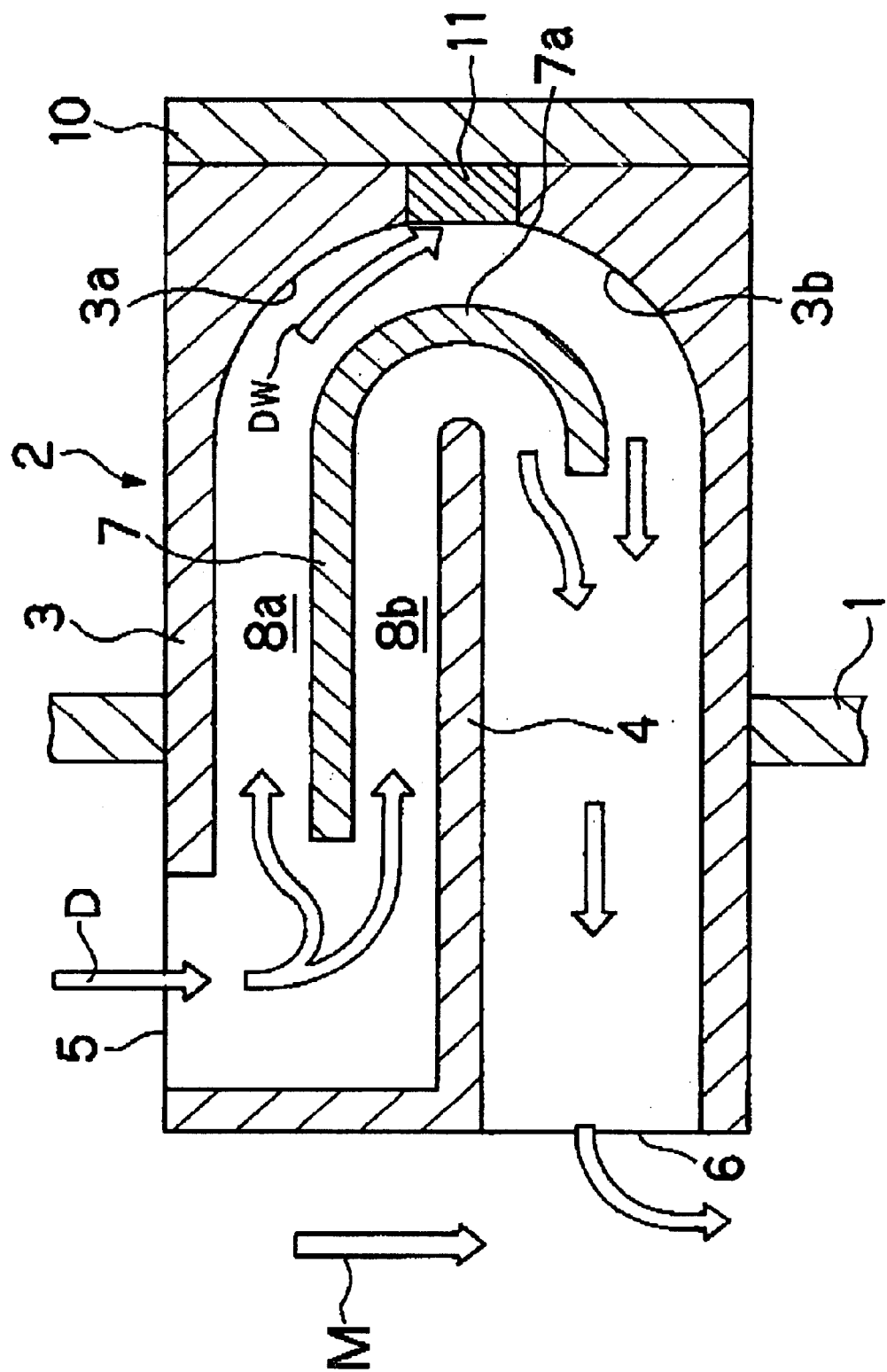
FIG. 1 is an explanatory view of a measurement device of an Embodiment 1 of the invention, and shows a longitudinal section along an axis direction of a main flow pipe.

Reference numerals are used to identify items shown in the drawings as follows:

| | |
|---|---|
| 1 | main flow pipe |
| 2 | divided flow pipe |
| 3 | outer wall (housing) of the divided flow pipe |
| 3a, 3b | protuberance |
| 4 | inlet plate (main separator) |
| 5 | inlet port |
| 6 | outlet port |
| 7 | partition |
| 7a | protrusion portion |

-continued

| | |
|---|---|
| 8a, 8b | branch flow passage |
| 10 | base plate (circuit board, control board) |
| 11 | detection element |
| 12, 13, 14 | undulation portion |
| 20 | divided flow pipe |
| 23 | outer wall of the divided flow pipe |
| 23a, 23b | protuberance |
| 24 | inlet plate (main separator) |
| 25 | inlet port |
| 26 | outlet port |
| 27 | partition |
| 27a | protrusion portion |
| 28a, 28b | branch flow passage |
| 29 | top outer wall |
| 30 | base plate (circuit board, control board) |
| 31 | detection element |
| 32, 33 | undulation portion |
| 34 | bypass flow passage |
| 35 | orifice member |
| 40, 42, 44 | top outer wall |
| 40a, 42a, 44a | protrusion portion |
| 41, 43, 45 | inlet plate |
| 41a | protrusion portion |
| 43a, 45a | one end of the inlet plate |
| 92 | divided flow pipe |
| 93 | outer wall of the divided flow pipe |
| 93a, 93b | protuberance |
| 94 | inlet plate (main separator) |
| 95 | inlet port |
| 96 | outlet port |
| 97 | partition |
| 97a | protrusion portion |
| 98a, 98b | branch flow passage |
| 99 | top outer wall |
| 99a | protrusion portion |
| 100 | base plate (circuit board, control board) |
| 101 | detection element |
| 104 | orifice |
| 112 | divided flow pipe |
| 113 | outer wall of the divided flow pipe |
| 113a, 113b | protuberance |
| 114 | inlet plate (main separator) |
| 115 | inlet port |
| 116 | outlet port |
| 119 | top outer wall |
| 118a, 118b, 118c | branch flow passage |
| 120 | base plate (circuit board, control board) |
| 121 | detection element |
| 122, 123 | undulation portion |
| 124 | bypass flow passage |
| 137, 138 | plural partitions |
| 137a | protrusion portion |
| 142 | divided flow pipe |
| 143 | outer wall of the divided flow pipe |
| 143a, 143b | protuberance |
| 144 | inlet plate (main separator) |
| 145 | inlet port |
| 146 | outlet port |
| 147 | partition |
| 147a | protrusion portion |
| 148a, 148b | branch flow passage |
| 150 | base plate (circuit board, control board) |
| 151 | detection element |
| 152, 153 | undulation portion |
| 162 | divided flow pipe |
| 163 | outer wall of the divided flow pipe |
| 163a, 163b | protuberance |
| 164 | inlet plate (main separator) |
| 164a | enlarged portion |
| 165 | inlet port |
| 166 | outlet port |
| 167 | partition |
| 167a | protrusion portion |
| 168a, 168b | branch flow passage |
| 169 | top outer wall |
| 170 | base plate (circuit board, control board) |
| 171 | detection element |
| 172, 173 | undulation portion |
| 174 | bypass flow passage |
| 182 | divided flow pipe |
| 183 | outer wall of the divided flow pipe |
| 184 | inlet plate (main separator) |
| 184a | protrusion portion |
| 185 | inlet port |
| 186 | outlet port |
| 187 | partition |
| 188a, 188b | branch flow passage |
| 189 | top outer wall |
| 191 | detection element |
| 192, 193 | undulation portion |
| 194 | bypass flow passage |
| 202, 203 | undulation portion |
| 222 | divided flow pipe |
| 223 | outer wall of the divided flow pipe |
| 223a, 223b | protuberance |
| 224 | inlet plate (main separator) |
| 224a | protrusion portion |
| 225 | inlet port |
| 226 | outlet port |
| 227 | partition |
| 227a | protrusion portion |
| 228a, 228b | branch flow passage |
| 230 | base plate |
| 231 | detection element |
| 232, 242 | undulation portion |
| 250 | Venturi |
| 270 | partition |
| 278a, 278b | branch flow passage |
| 280 | base plate |
| 281 | detection element |
| 290 | Venturi |
| M | main flow |
| D | divided flow |
| D1 | flow flowing into the plural branch flow passages |
| D2 | flow via the bypass flow passage |
| DW | down flow |
| P | pollution substance (particulate material, PM) |
| L | distance between partition end portion and open inner wall of partition side of the inlet port |
| H1 | height of the undulation portion protruding than flow passage face defining the branch flow passage formed on the partition |
| H2 | height of the undulation portion protruding than flow passage face defining the branch flow passage formed on the partition |
| W1 | flow sectional direction diameter W1 of the bypass flow passage |
| W2 | orifice diameter |
| N | narrowest portion |

DESCRIPTION OF THE PREFERRED EMBODIMENTS

FIG. 1 is an explanatory view of a measurement device according to an Embodiment 1 of the invention, and shows a longitudinal section along an axis direction of a main flow pipe. Referring to FIG. 1, within a main flow pipe 1, a main flow M which is a measurement object is flowing. In a pipe wall of the main flow pipe 1, a divided flow pipe 2 is mounted orthogonally to a pipe axis direction of the main flow pipe 1 so as to be able to take in a divided flow D separated from the main flow M. Within the divided flow pipe 2, a divided flow pipe passage curved approximately in Ω-shape form is formed by an inlet plate 4 (main separator) extending in a direction approximately orthogonal to a flow direction (main flow pipe 1 pipe axis direction) of the main flow M. An inlet port (becoming also an outlet port) 5 opening in a face approximately orthogonal to the flow direction of the main flow M is formed in one end of an outer wall of the divided flow pipe 2, and an outlet port (becoming also an inlet port) 6 opening in a face approximately parallel to the flow direction of the main flow M is formed in a top outer wall, of the divided flow pipe 2, extending along the main flow pipe 1 pipe axis direction.

Additionally, within the divided flow pipe 2, a partition 7 curved complying with a curved shape of the divided flow pipe 2 is formed. Within the divided flow pipe 2, by this partition 7, there are formed plural branch flow passages 8a, 8b mutually branching and joining. In a bottom outer wall of the divided flow pipe 2, a detection element 11 is attached through a base plate 10 so as to be exposed to a flow in the outer peripheral side branch flow passage 8a. In this manner, the detection element 11 is disposed in a curved portion of the divided flow pipe 2 and, further, positioned outside the main flow pipe 1 so as to be easy to exchange.

Figure 2:
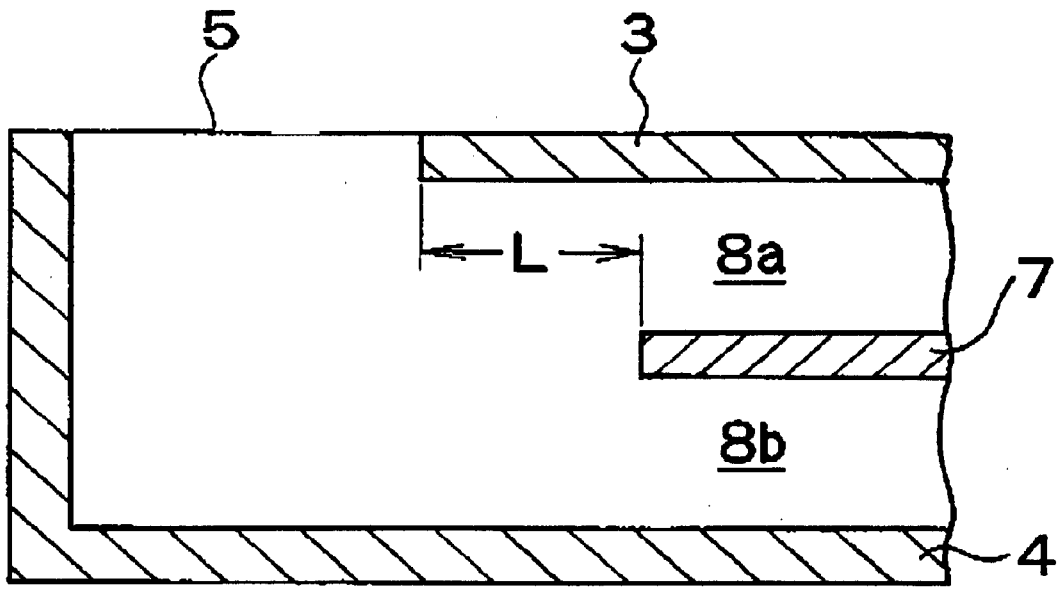
FIG. 2 is a partial enlarged view in which an inlet port 5 vicinity of a divided flow pipe 2 shown in FIG. 1 is enlarged.

FIG. 2 is a partial enlarged view in which a vicinity of the inlet port 5 of the divided flow pipe 2 shown in FIG. 1 is enlarged. As shown in FIG. 2, an inlet port 5 side end portion of the partition 7 exists in a position retracted by a distance L than a partition 7 side opening inner wall of the inlet port 5. That is, the end portion of the partition 7 does not extend to just below the inlet port 5, and at least an inlet of the outer peripheral side branch flow passage 8a does not open just below the inlet port 5.

Further, in the outer wall 3 forming the outer peripheral side branch flow passage 8a, protuberances 3a, 3b protruding toward a flow section center of the branch flow passage 8a are formed so as to put the detection element 11 between them on its both sides. In a portion of the partition 7 opposite to a detection face of the detection element 11, a protrusion portion 7a protruding toward the detection face is formed. A flow passage face on the protuberances 3a, 3b is formed in a concave curved face. A flow passage face of the protrusion portion 7a is formed in a convex curved face which is convex toward the detection element 11. By such a flow passage structure, a down flow DW obliquely flowing toward the detection face of the detection element 11 is formed.

Figure 3:
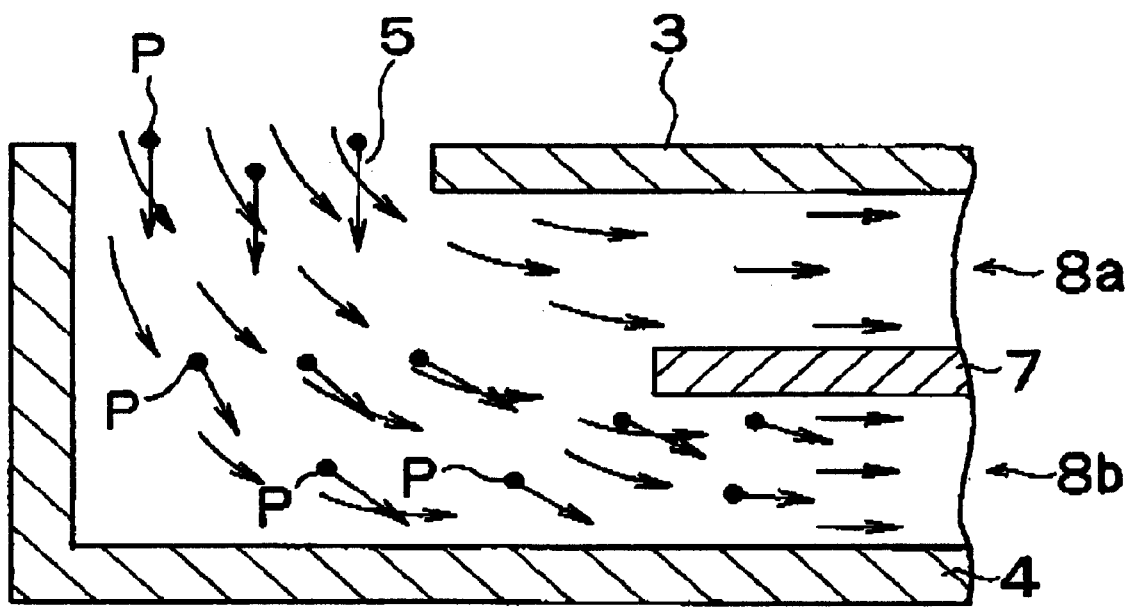
FIG. 3 is a partial enlarged operation view in which the inlet port 5 vicinity of the divided flow pipe 2 shown in FIG. 1 is enlarged.

Consecutively, an operation of this measurement device is explained. FIG. 3 is a partial enlarged operation view in which a vicinity of the inlet port 5 of the divided flow pipe 2 shown in FIG. 1 is enlarged.

Referring to FIG. 1 and FIG. 3, the divided flow D separated from the main flow M is taken into the divided flow pipe 2 from the inlet port 5. Within the divided flow pipe 2, the divided flow D is changed in its direction and flows into the outer peripheral side and inner peripheral side branch flow passages 8a, 8b. However, a pollution substance P whose density is higher than that of the measurement flow cannot follow completely to the change in the flow direction, so that it advances straight by an inertia to stagnate just below the inlet port 5 or enters into the inner peripheral side branch flow passage 8b. This is because, since end portion flow passages of the branch flow passages 8a, 8b extend in a direction approximately orthogonal to the flow direction of the divided flow D, the pollution substance P whose density is higher than that of the measurement fluid cannot follow completely to the direction change of the flow and, especially, the pollution substance P is prevented from entering into the outer peripheral side branch flow passage 8a adjacent to the inlet port 5. By this, the pollution substance P is prevented from being accumulated rather onto the detection element 11 disposed in the outer peripheral side branch flow passage 8a (requiring a sharp change in direction of the flow). Incidentally, according to this flow passage structure of the divided flow pipe 2, it is possible to suitably measure the normal flow flowing from the inlet port 5 toward the outlet port 6.

Figure 4:
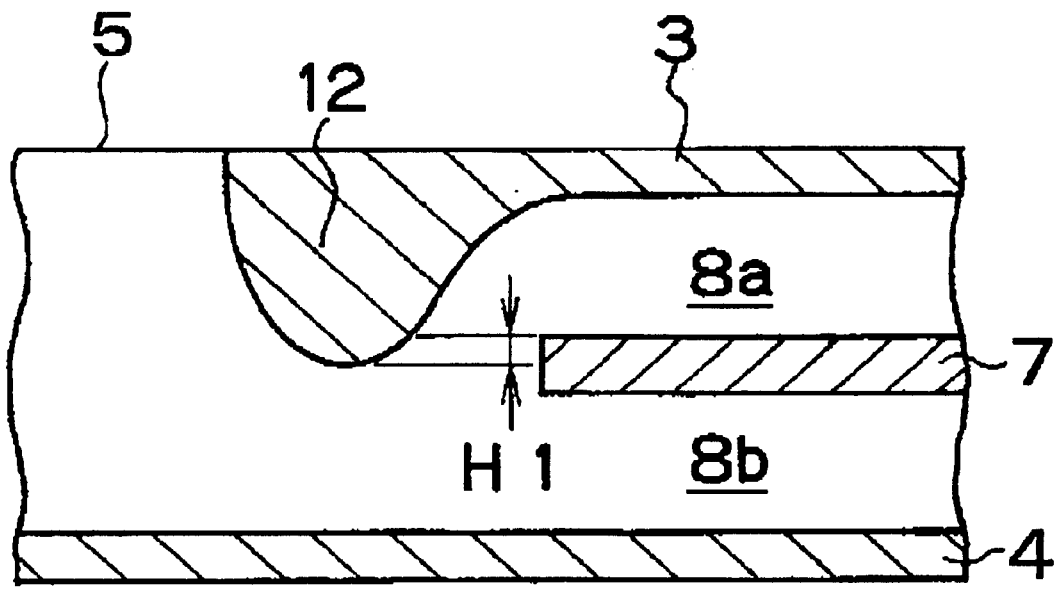
FIG. 4 is a partial enlarged view in which the divided flow pipe inlet port vicinity is enlarged in order to respectively explain a device of an Embodiment 2 of the invention.
Figure 5:
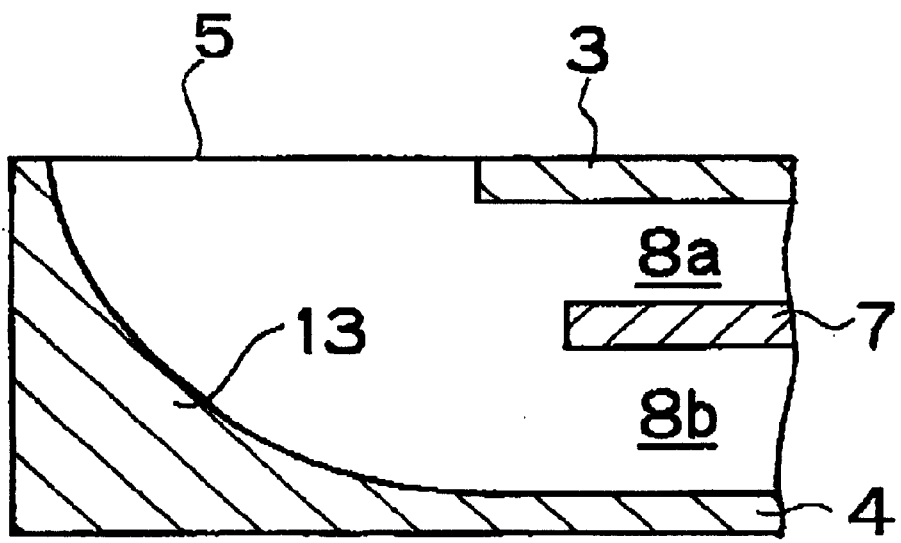
FIG. 5 is a partial enlarged view in which the divided flow pipe inlet port vicinity is enlarged in order to respectively explain a device of an Embodiment 3 of the invention.
Figure 6:
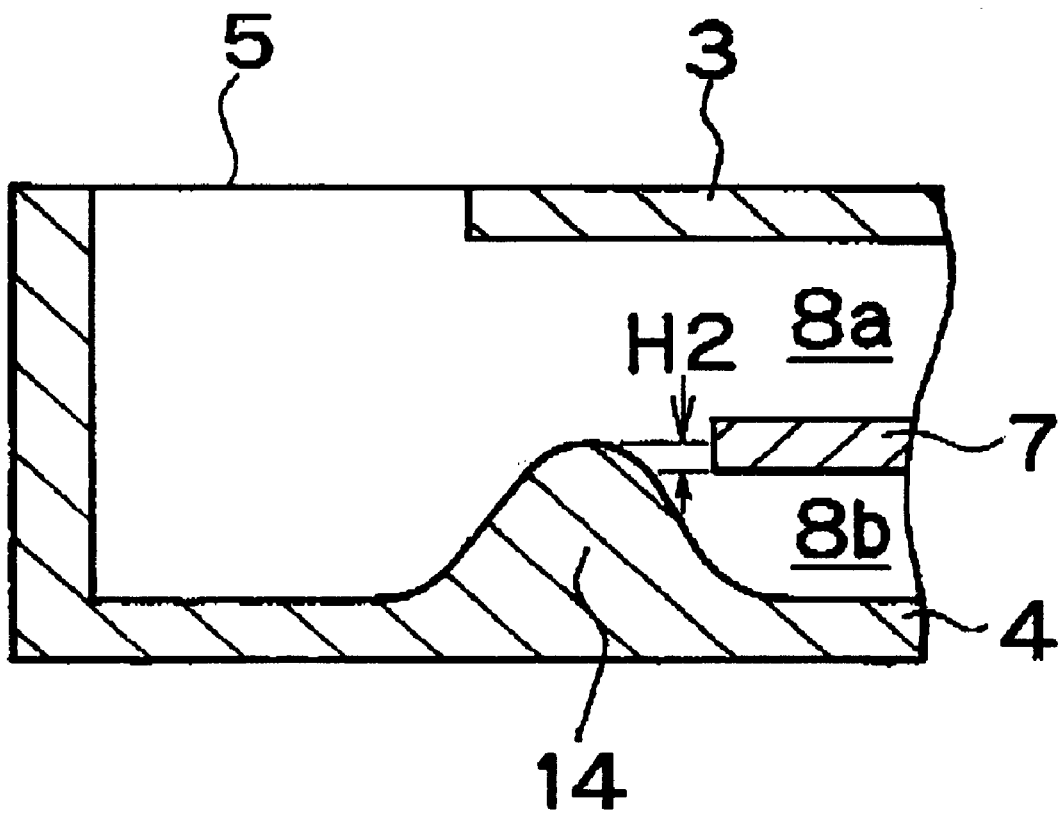
FIG. 6 is a partial enlarged view in which the divided flow pipe inlet port vicinity is enlarged in order to respectively explain a device of an Embodiment 4 of the invention.

Next, as Embodiments 2 to 4, various modification examples of the Embodiment 1 are explained. FIG. 4 to FIG. 6 are partial enlarged views in which a vicinity of the inlet port of the divided flow pipe is enlarged for respectively explaining in order the measurement devices of the Embodiments 2 to 4 of the invention. Incidentally, in the devices of the Embodiments 2 to 4, the structures other than the portions shown in FIG. 4 to FIG. 6 are basically similar to the device of the Embodiment 1.

Referring to FIG. 4, in the measurement device of the Embodiment 2, inside the outer wall 3 of the divided flow pipe, in the vicinity of the inlet port 5 there is formed an undulation portion 12 so as to clog an inlet of the outer peripheral side branch flow passage 8a. An apex of the undulation portion 12 protrudes by a height H1 toward the inlet plate 4 beyond an inner peripheral side flow passage face of the outer peripheral side branch flow passage 8a formed on the partition 7. By this undulation portion 12, a throttle is formed in a flow passage between the inlet port 5 of the divided flow pipe 2 and the inlet of the outer peripheral side branch flow passage 8a in which the detection element 11 is disposed. By such a flow passage structure, the pollution of the detection element 11 is further prevented.

Referring to FIG. 5, in the measurement device of the Embodiment 3, below the inlet port 5, an undulation portion 13 having a flow passage face of a concave curved face form is formed in an inner peripheral side flow passage wall (between the inlet plate and a top outer wall of the divided flow pipe) forming the divided flow pipe passage. By this, the flow toward the branch flow passages 8a, 8b is adjusted. Further, by such a undulation portion 13, it is also possible to form the throttle and, moreover, it is also possible to guide the pollution substance rather to the inner peripheral side branch flow passage 8b in which the detection element 31 is not disposed.

Referring to FIG. 6, in the measurement device of the Embodiment 4, in an inlet port 5 side inner wall of the inlet plate 4 there is formed an undulation portion 14 so as to clog an inlet of the inner peripheral side branch flow passage 8b. An apex of the undulation portion 14 protrudes by a height H2 beyond the outer wall 3 than an outer peripheral side flow passage face of the inner peripheral side branch flow passage 8b formed on the partition 7. By this undulation portion 14, a throttle is formed in a flow passage between the inlet port 5 of the divided flow pipe 2 and the inlet of the inner peripheral side branch flow passage 8b and, further, a stagnant portion is formed in a left side of the undulation portion 14 in FIG. 6. By such a flow passage structure, it is made possible to dispose the detection element rather in the inner peripheral side branch flow passage 8b.

Figure 7:
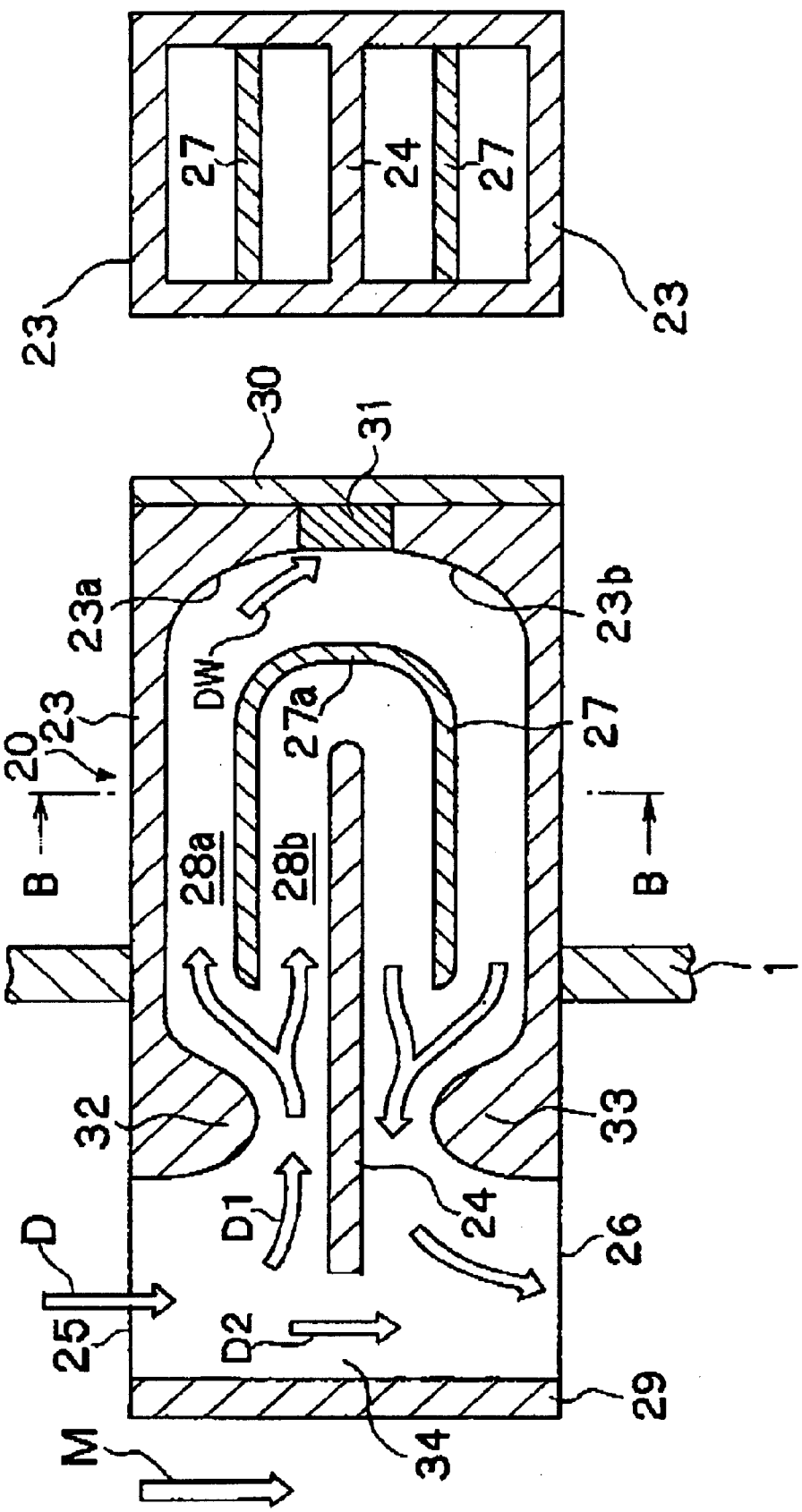
FIGS. 7(A) and (B) are explanatory views of a measurement device concerning a flow of an Embodiment 5 of the invention, wherein (A) shows a longitudinal section along the axis direction of the main flow pipe, and (B) a B—B section in (A).
FIG. 12 is a view in which the device of the Embodiment 5 explained by referring to FIG. 7(A) and FIG. 7(B) is depicted again.

FIG. 7(A) and FIG. 7(B) are explanatory views of the measurement device concerning a flow of the Embodiment 5 of the invention, wherein FIG. 7(A) is a longitudinal section along the axis direction of the main flow pipe, and FIG. 7(B) shows a B—B section in FIG. 7(A). Referring to FIG. 7(A) and FIG. 7(B), in the main flow pipe 1, the main flow M which is a measurement object, is flowing. In the pipe wall of the main flow pipe 1 a divided flow pipe 20 is mounted orthogonally to the pipe axis direction of the main flow pipe 1 so as to be able to take in the divided flow D separated from the main flow M. Within the divided flow pipe 20, the divided flow pipe passage curved approximately in Ω-shape is formed by an inlet plate 24 (main separator) extending in a direction approximately orthogonal to the flow direction (main flow pipe 1 pipe axis direction) of the main flow M. An inlet port (becoming also an outlet port) 25 and an outlet port (becoming also an inlet port) 26 respectively opening in faces approximately orthogonal to the flow direction of the main flow M are oppositely formed in both ends of an outer wall 23 of the divided flow pipe 20. A bypass flow passage 34 is formed between a top outer wall 29 of the divided flow pipe 20 and one end of the inlet plate 24, thereby short-circuiting between an inlet port 25 and an outlet port 26. As mentioned later, the divided flow D is sharply changed in its direction approximately at a right angle, so that a first divided flow D1 whose pollution substance content is low flows toward inlets of plural branch flow passages 28a, 28b mentioned later, while the pollution substance whose density is relatively high is carried by a second divided flow D2 and advances straight from the inlet port 25 to the outlet port 26 via the bypass flow passage 34 and is discharged outside the divided flow pipe 20 (a reverse of this is similar as well).

Additionally, within the divided flow pipe 20, there is formed a partition 27 curved complying with a curved shape of the divided flow pipe 20. Within the divided flow pipe 20, by this partition 27 there are formed the plural branch flow passages 28a, 28b mutually branching and joining. In insides of both end portions of the outer wall 23 (vicinities of the inlet port 25 and the outlet port 26), undulation portions 32, 33 are respectively formed so as to clog an inlet and an outlet of the outer peripheral side branch flow passage 28a. By the undulation portions 32, 33, throttles are formed respectively in a passage between the inlet port 25 and the inlet of the outer peripheral side branch flow passage 28a and a flow passage between the outlet port 26 and the outlet of the outer peripheral side branch flow passage 28a.

In a bottom outer wall of the divided flow pipe 20, a detection element 31 is attached through a base plate 30 so as to be exposed to a flow in the outer peripheral side branch flow passage 28a. In this manner, the detection element 31 is disposed in a curved portion of the divided flow pipe 20 and, further, positioned outside the main flow pipe 1 so as to be easy to exchange. Further, inside the outer wall 23 bottom portion, protuberances 23a, 23b protruding toward a flow section center of the branch flow passage 28a are formed so as to put the detection element 31 between them on its both sides. In a portion of the partition 27 opposite to a detection face of the detection element 31, a protrusion portion 27a protruding toward the detection face is formed. A flow passage face on the protuberances 23a, 23b is formed in a concave curved face. A flow passage face of the protrusion portion 27a is formed in a convex curved face which is convex toward the detection element 31. By such a flow passage structure, the down flow DW obliquely flowing toward the detection face of the detection element 31 is formed.

Consecutively, an operation of this measurement device is explained by referring to FIG. 7(A) and FIG. 7(B) again.

(1) The divided flow D separated from the main flow M is taken into the divided flow pipe 20 from the inlet port 25.

(2) The divided flow D is divided in front of the inlets of the plural branch flow passages 28a, 28b into the flow D1 (flow changed in its direction) approximately orthogonal to the flow direction of the main flow M and the flow D2 approximately parallel to the flow direction of the main flow M.

(3a) The flow D1 is raised in its flow velocity by the throttle formed by the undulation portion 32 and flows into the plural branch flow passages 28a, 28b. Here, since the pollution substance whose density is relatively higher than that of the measurement fluid cannot follow a sharp direction change of the flow after having been throttled, it enters rather into the inner peripheral side branch flow passage 28b by inertia. Therefore, it follows that the measurement fluid whose pollution substance content is very low flows rather into the outer peripheral side branch flow passage 28a having the detection element 31. And, a flow obliquely impinging against the detection face of the detection element 31, i.e., the down flow DW, occurs.

(3b) The flow D2 flows into the bypass flow passage 34.

(4) The flow D1 having flowed into the plural branch flow passages 28a, 28b is drawn out by the flow D2 having flowed though the bypass flow passage 34 and returned into the main flow pipe 1 from the outlet port 26.

Further, within this divided flow pipe 20, there is formed a flow passage structure along the flow direction in the divided flow pipe passage of approximately Ω-shape form and symmetrical with the detection element 31 being made a center. Therefore, according to this divided flow pipe 20, the accumulation of the pollution substance onto the detection element 31 is prevented and, besides, it is possible to measure both of the normal flow and the reverse flow with an equivalent detection output level.

Figure 8:
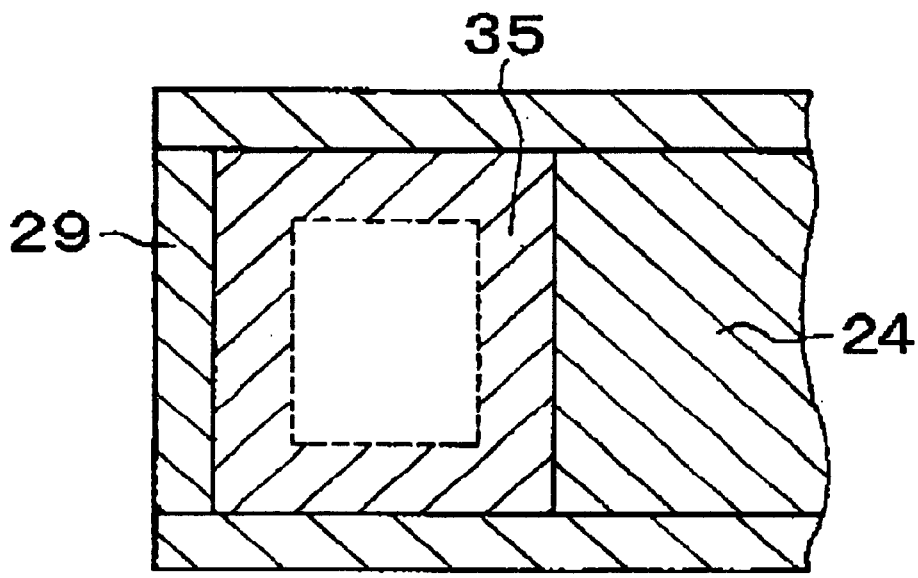
FIGS. 8(A) and (B) are explanatory views of a device of an Embodiment 6 of the invention, wherein (A) is a partial enlarged sectional view (showing a section parallel to a flow section of a divided flow D) of a divided flow passage top outer wall and an inlet plate one end portion vicinity, and (B) a sectional view orthogonal to (A).
Figure 8:
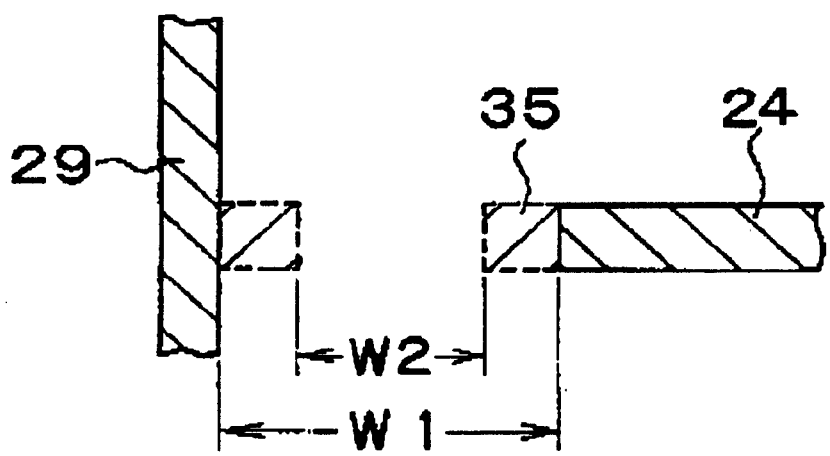

Next, as an Embodiment 6, a modification example of the Embodiment 5 is explained. FIG. 8(A) and FIG. 8(B) are explanatory views of the device of the Embodiment 6 of the invention, wherein FIG. 8(A) is a partial enlarged sectional view (showing a section parallel to a flow section of the divided flow D) in the vicinity of the divided flow pipe top outer wall and the inlet plate one end portion, and FIG. 8(B) a sectional view orthogonal to FIG. 8(A). Incidentally, in the device of the Embodiment 6, the structure other than the portions shown in FIG. 8(A) and FIG. 8(B) is basically similar to the device of the Embodiment 5.

Referring to FIG. 8(A) and FIG. 8(B), an orifice member 35 is attached or integrally formed between the top outer wall 29 of the divided flow pipe and one end of the inlet plate 24, i.e., in the bypass flow passage (34 in FIG. 7(A)) in the Embodiment 5. By adjusting an orifice diameter W2 with respect to a flow sectional direction diameter W1 of the bypass flow passage, it is possible to quantitatively control a flow rate toward the branch flow passage in which the detection element is disposed.

Figure 9:
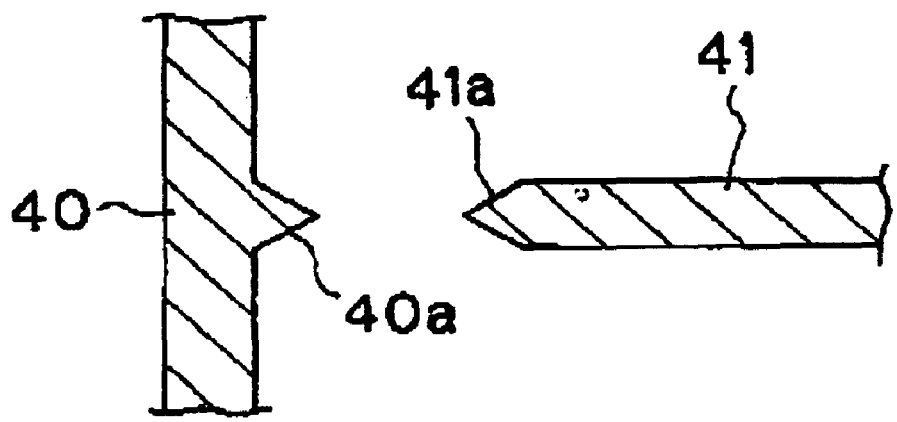
FIGS. 9(A) to (C) are partial enlarged views showing a vicinity of an orifice bypassing the inlet port and an outlet port of the divided flow pipe in order to explain devices of Embodiments 7 to 9 of the invention in order, respectively.
Figure 9:
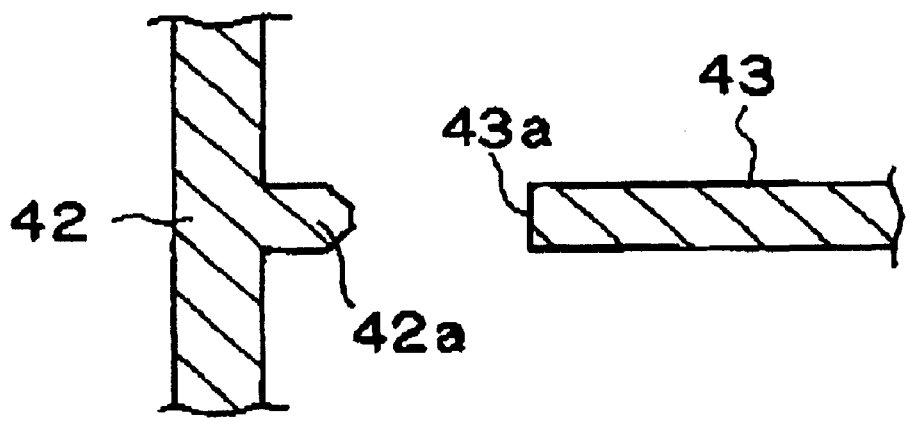
Figure 9:
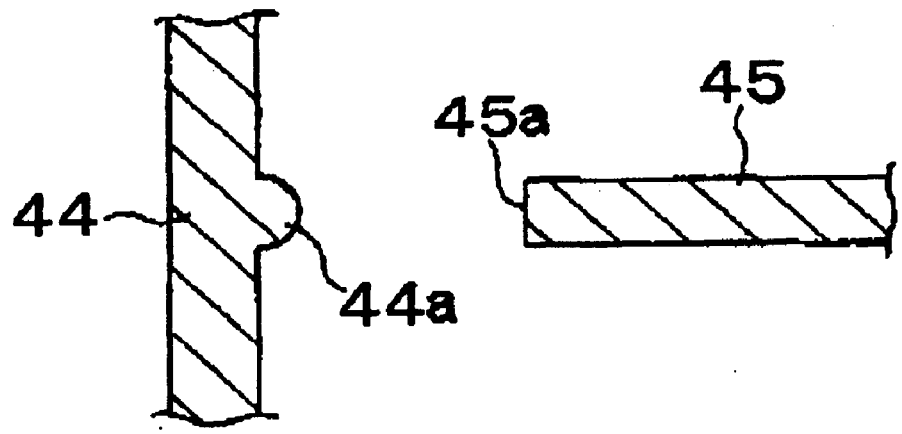

Next, as Embodiments 7 to 9, various modification examples of the Embodiment 6 are explained. FIG. 9(A) to FIG. 9(C) are partial enlarged views showing a vicinity of an orifice bypassing between an inlet port and an outlet port of the divided flow pipe in order to respectively explain in order the devices of the Embodiments 7 to 9 of the invention. Incidentally, in the devices of the Embodiments 7 to 9, the structures other than the portions shown in the drawings are basically similar to the device of the Embodiment 6.

Referring to FIG. 9(A), triangle protrusion portions 40a, 41a are respectively formed in one end of an inlet plate 41 and a top outer wall 40 opposite to the one end and, by these protrusion portions 40a, 41a, an orifice is formed in the bypass flow passage short-circuiting between the inlet port and the outlet port of the divided flow pipe.

Referring to FIG. 9(B), one end 43a of an inlet plate 43 is rectangular and a polygonal protrusion portion 42a is formed in a top outer wall 42 opposite to the one end 43a and, by the one end 43a and the polygonal protrusion portion 42a, an orifice is formed in the bypass flow passage short-circuiting between the inlet port and the outlet port of the divided flow pipe.

Referring to FIG. 9(C), one end 45a of an inlet plate 45 is rectangular and a curved face form (semicircular) protrusion portion 44a is formed in a top outer wall 44 opposite to the one end 45a and, by the one end 45a and the curved face form protrusion portion 44a, an orifice is formed in the bypass flow passage short-circuiting between the inlet port and the outlet port of the divided flow pipe.

Comparison of Comparison Example 1 with Embodiment 5

Figure 10:
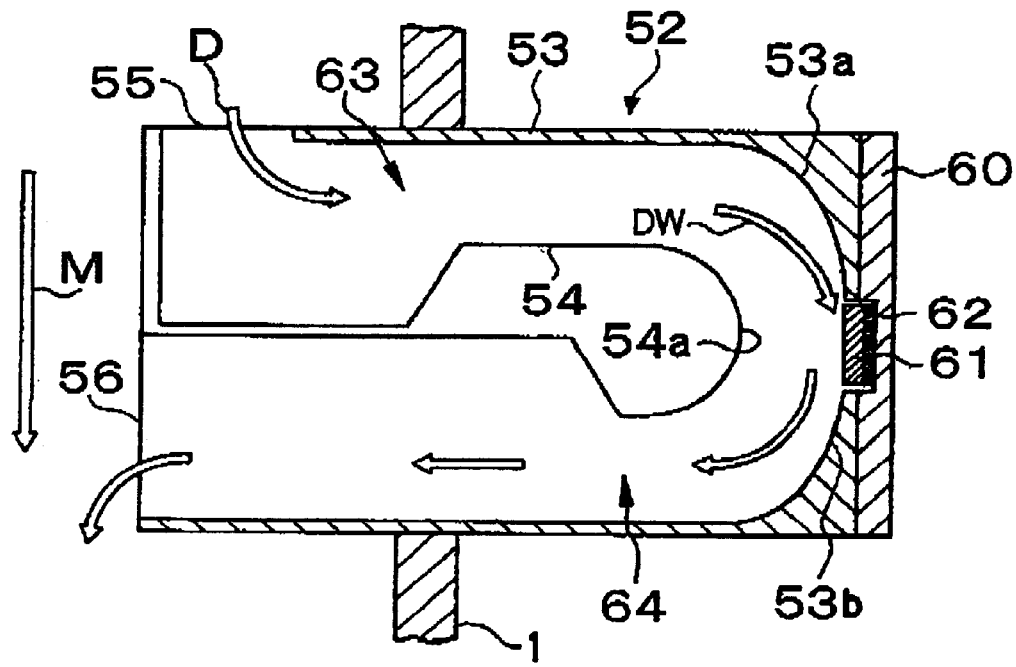
FIG. 10 is an explanatory view of a measurement device of a Comparison Example 1, and shows a longitudinal section along the axis direction of the main flow pipe.

Next, especially as to the measurement of the reverse flow, a sensor (detection) output of a measurement device of a Comparison Example 1 and a sensor output of the measurement device of the Embodiment 5 are explained in comparison. First, a structure of the measurement device of the Comparison Example 1 is explained mainly concerning points of difference from the measurement device of the Embodiment 5. FIG. 10 is an explanatory view of the measurement device of the Comparison Example 1, and shows a longitudinal section along the axis direction of the main flow pipe. Referring to FIG. 10, in the pipe wall of the main flow pipe 1, a divided flow pipe 52 is mounted orthogonally to the pipe axis direction of the main flow pipe 1 so as to be able to take in the divided flow D separated from the main flow M. Within the divided flow pipe 52, a divided flow pipe passage curved approximately in Ω-shape form is formed by an inner wall 54 (main separator). In an outer wall 53 side portion of the divided flow pipe 52, an inlet port (becoming also an outlet port) 55 of the curved divided flow pipe passage is formed in a face approximately orthogonal to the flow direction of the main flow M, and an outlet port (becoming also an inlet port) 56 of the divided flow pipe passage opening in a face approximately parallel to the flow direction of the main flow M is formed in a top outer wall, of the divided flow pipe 52, extending along the main flow pipe 1 pipe axis direction. In the vicinity of the inlet port 55, the divided flow pipe passage is reduced in its diameter (a reduced diameter portion 63 is formed) toward a detection element 61 side along a flow direction from the inlet port 55 toward the outlet port 56, and it is increased in its diameter (an increased diameter portion 64 is formed) between the detection element 61 and the outlet port 56.

Further, in the outer wall 53 of the divided flow pipe 52, protuberances 53a, 53b protruding toward a flow section center of the divided flow pipe passage are formed so as to put the detection element 61 between them on its both sides. A flow passage face on the protuberances 53a, 53b is formed in a concave curved face. In a portion of the inner wall 54 of the divided flow pipe 52 opposite to the detection element 61, a protrusion portion 54a protruding toward the detection face is formed. A flow passage face of the protrusion portion 54a is formed in a convex curved face which is convex toward the detection element 61. By such a flow passage structure, the down flow DW obliquely flowing toward the detection face of the detection element 61 is formed.

Figure 11:
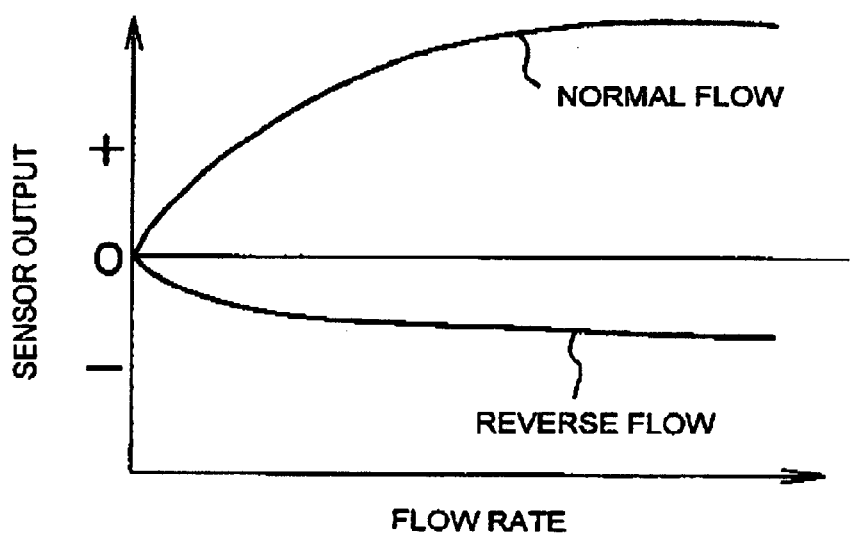
FIG. 11 is a graph showing flow rate characteristics of the device of the Comparison Example 1 shown in FIG. 10.

FIG. 11 is a graph showing flow rate characteristics of the device of the Comparison Example 1 shown in FIG. 10. Referring to FIG. 10, according to the measurement device of the Comparison Example 1, since along the flow direction there is formed a flow passage structure asymmetrical with the detection element 61 being made a center, it is impossible to detect with an equivalent detection output level both of the normal flow (flow from the inlet port 55 toward the outlet port 56) and the reverse flow (flow from the outlet port 56 toward the inlet port 55).

Figure 12:
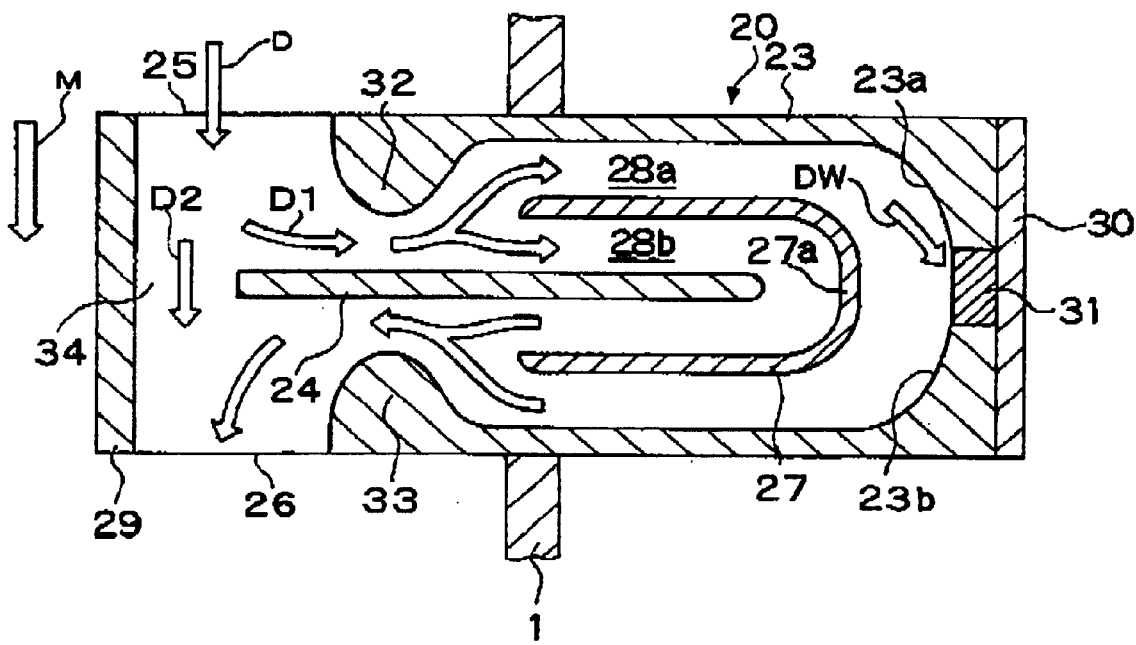
Figure 13:
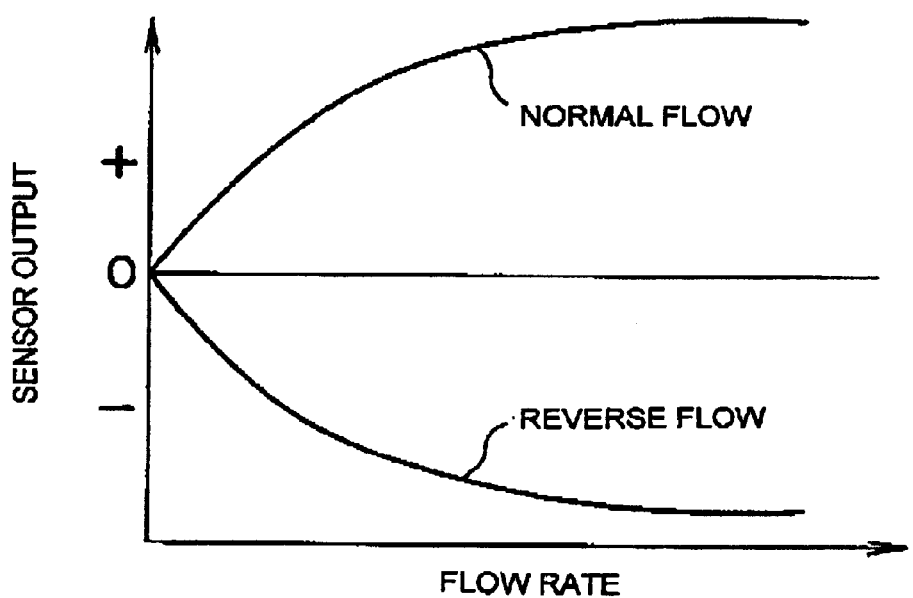
FIG. 13 is a graph showing flow rate characteristics of the device of the Embodiment 5 shown in FIG. 12.

On the other hand, FIG. 12 is a view in which the device of the Embodiment 5 explained by referring to FIG. 7(A) and FIG. 7(B) mentioned before is depicted again, and FIG. 13 a graph showing flow rate characteristics of the device of the Embodiment 5. Referring to FIG. 12, within the divided flow pipe 20 in the measurement device of the Embodiment 5, along the flow direction there is formed a flow passage structure symmetrical with the detection element 31 being made a center. Referring to FIG. 13, therefore, by using this divided flow pipe 20, it is possible to detect with an equivalent detection output level both of the normal flow (flow from the inlet port 25 toward the outlet port 26) and the reverse flow (flow from the outlet port 26 toward the inlet port 25).

Hereunder, various Embodiments 10 to 15 of the measurement device according to the invention are explained. Incidentally, in the explanations recited below about the Embodiments 10 to 15, in order to avoid repetitions of the description, points of difference from the measurement device concerning a flow of the Embodiment 5 are mainly explained, and it is construed that the descriptions relating to the Embodiment 5 are referred as to the similar points. Further, the flow passage structure in the divided flow pipe in each of the Embodiments 10 to 14 is symmetrical along the flow direction with the detection element being made a center, and can measure with an equivalent detection output level both of the normal flow and the reverse flow. Further, the measurement device of the Embodiment 15 is suitable for measuring the normal flow.

Figure 14:
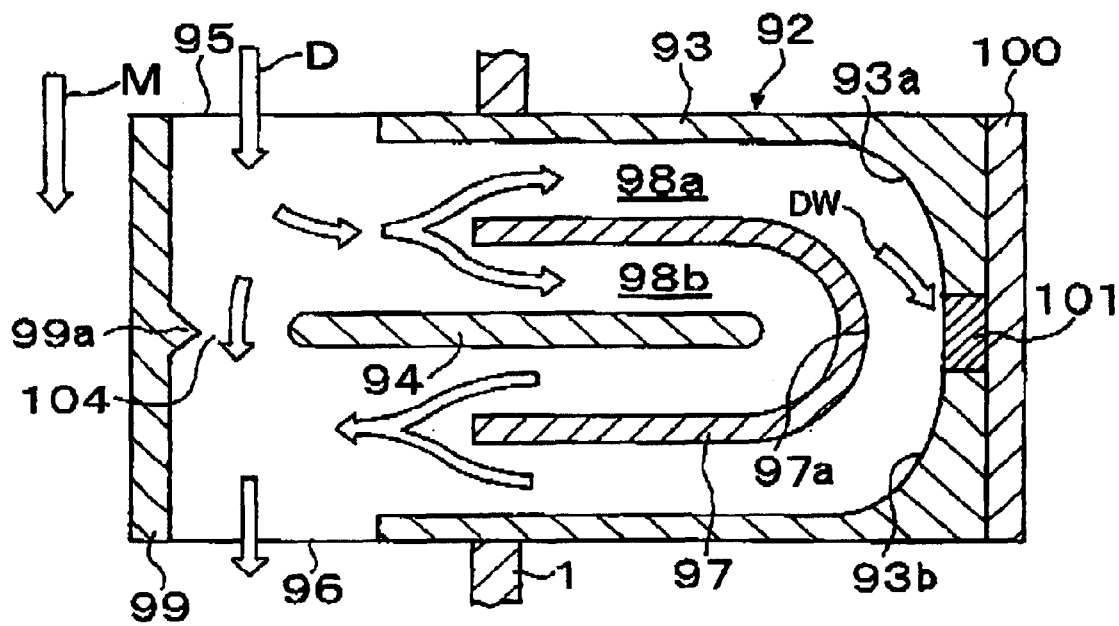
FIG. 14 is an explanatory view of a measurement device of an Embodiment 10 of the invention, and shows a longitudinal section along the axis direction of the main flow pipe.

FIG. 14 is an explanatory view of the measurement device of an Embodiment 10 of the invention, and shows a longitudinal section along the axis direction of the main flow pipe. Referring to FIG. 14, within a divided flow pipe 92, a divided flow pipe passage curved approximately in Ω-shape form is formed by an inlet plate 94 extending in a direction approximately orthogonal to the flow direction of the main flow M. In both ends of an outer wall of the divided flow pipe 92, an inlet port 95 and an outlet port 96 opening in faces approximately orthogonal to the flow direction of the main flow M are oppositely formed. Further, within the divided flow pipe 92, by a curved partition 97 there are formed plural branch flow passages 98a, 98b mutually branching and joining. In an outer wall 93 bottom portion of the divided flow pipe 92, a detection element 101 is attached through a base plate 100. Further, inside the outer wall 93, protuberances 93a, 93b are formed so as to put the detection element 101 between them on its both sides. In the partition 97, a protrusion portion 97a protruding toward a detection face of the detection element 101 is formed. By such a flow passage structure, the down flow DW obliquely flowing toward the detection face of the detection element 101 is formed. Inside a top outer wall 99 opposite to one end of the inlet plate 94, a triangle protrusion portion 99a is formed, and an orifice 104 is formed in a bypass flow passage short-circuiting between the inlet port 95 and the outlet port 96.

Figure 15:
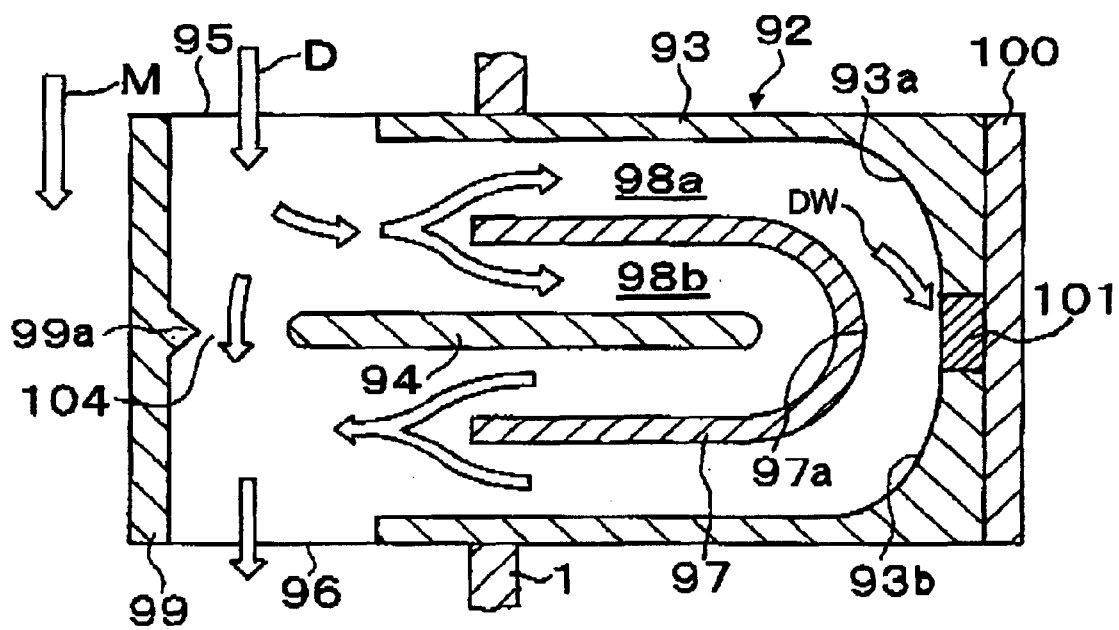
FIG. 15 is an explanatory view of a measurement device of an Embodiment 11 of the invention, and shows a longitudinal section along the axis direction of the main flow pipe.

FIG. 15 is an explanatory view of the measurement device of an Embodiment 11 of the invention, and shows a longitudinal section along the axis direction of the main flow pipe. Referring to FIG. 15, within a divided flow pipe 112, a divided flow pipe passage curved approximately in Ω-shape form is formed by an inlet plate 114 extending in a direction approximately orthogonal to the flow direction of the main flow M. In both ends of an outer wall of the divided flow pipe 112, an inlet port 115 and an outlet port 116 opening in faces approximately orthogonal to the flow direction of the main flow M are oppositely formed. Further, within the divided flow pipe 112, by curved partitions 137, 138 there are formed, from an outer peripheral side toward an inner peripheral side in order, plural branch flow passages 118a, 118c, 118b mutually branching and joining. Inside both end portions of an outer wall 113 (in the vicinity of the inlet port 115 and the outlet port 116), undulation portions 122, 123 are respectively formed so as to respectively clog inlets and outlets of the branch flow passages 118a, 118c. By the undulation portions 122, 123, throttles are formed respectively in a flow passage between the inlet port 115 and the inlets of the branch flow passages 118a, 118c and a flow passage between the outlet port 116 and the outlets of the branch flow passages 118a, 118c. In an outer wall 113 bottom portion of the divided flow pipe 112, a detection element 121 is attached through a base plate 120. Further, inside the outer wall 113, protuberances 113a, 113b are formed so as to put the detection element 121 between them on its both sides. In the partition 137, a protrusion portion 137a protruding toward a detection face of the detection element 121 is formed. By such a flow passage structure, the down flow DW obliquely flowing toward the detection face of the detection element 121 is formed. Inside one end of the inlet plate 114 and a top outer wall 119 opposite to the one end, there is formed a bypass flow passage 124 short-circuiting between the inlet port 115 and the outlet port 116.

Figure 16:
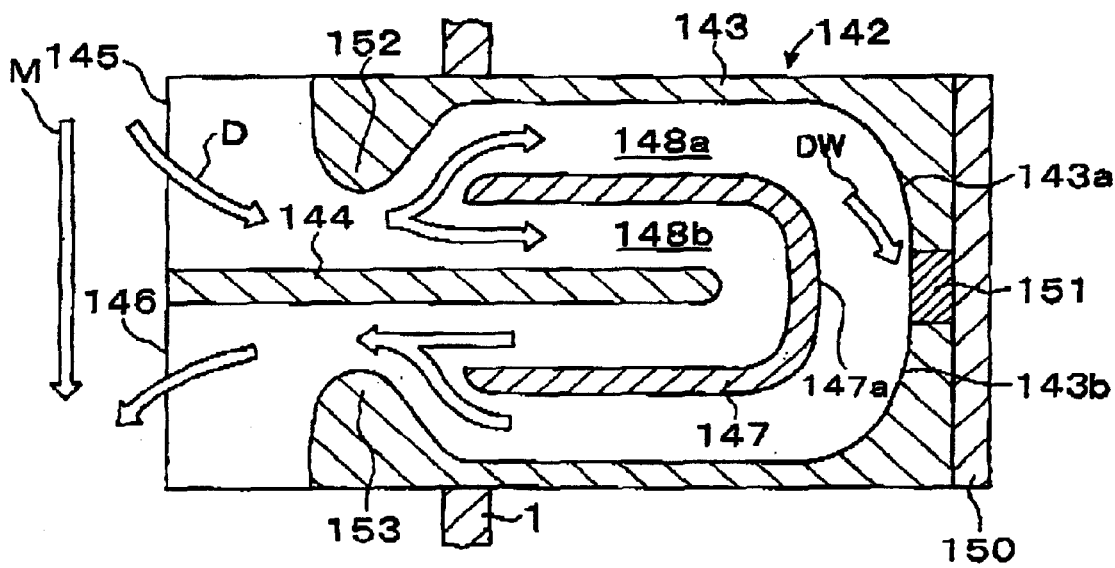
FIG. 16 is an explanatory view of a measurement device of an Embodiment 12 of the invention, and shows a longitudinal section along the axis direction of the main flow pipe.

FIG. 16 is an explanatory view of the measurement device of an Embodiment 12 of the invention, and shows a longitudinal section along the axis direction of the main flow pipe. Referring to FIG. 16, within a divided flow pipe 142, a divided flow pipe passage curved approximately in Ω-shape form is formed by a inlet plate 144 extending in a direction approximately orthogonal to the flow direction of the main flow M. In both ends of an outer peripheral portion of a top outer wall and an outer wall 143 of the divided flow pipe 142, there are formed an inlet port 145 opening in a face approximately parallel to the flow direction of the main flow M and an outlet port 146 opening in a face approximately orthogonal to the same. The divided flow D is introduced into the divided flow pipe 142 mainly from a slant direction. Further, within the divided flow pipe 142, by a curved partition 147 there are formed plural branch flow passages 148a, 148b mutually branching and joining. Inside both end portions of the outer wall 143 (in the vicinity of the inlet port 145 and the outlet port 146), undulation portions 152, 153 are respectively formed so as to respectively clog an inlet and an outlet of the outer peripheral side branch flow passages 148a. By the undulation portions 152, 153, throttles are formed respectively in a flow passage between the inlet port 145 and the inlet of the outer peripheral side branch flow passages 148a, and a flow passage between the outlet port 146 and the outlet of the outer peripheral side branch flow passages 148a. In an outer wall 143 bottom portion of the divided flow pipe 142, a detection element 151 is attached through a base plate 150. Further, inside the outer wall 143, protuberances 143a, 143b are formed so as to put the detection element 151 between them on its both sides. In an intermediate portion of the partition 147, a protrusion portion 147a protruding toward a detection face of the detection element 151 is formed. By such a flow passage structure, the down flow DW obliquely flowing toward the detection face of the detection element 151 is formed.

Figure 17:
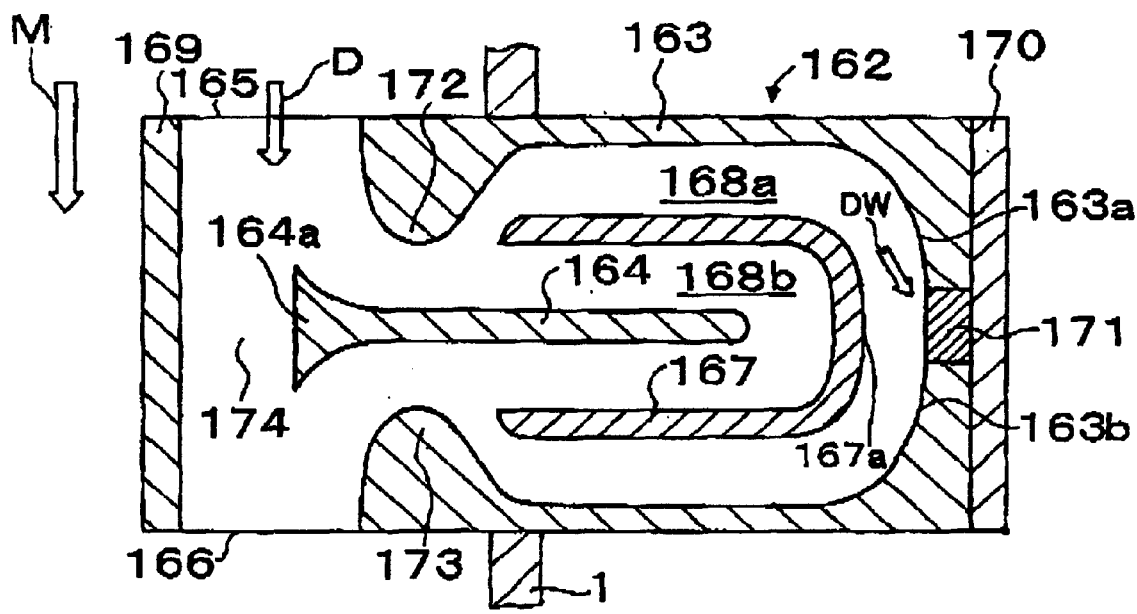
FIG. 17 is an explanatory view of a measurement device of an Embodiment 13 of the invention, and shows a longitudinal section along the axis direction of the main flow pipe.

FIG. 17 is an explanatory view of the measurement device of an Embodiment 13 of the invention, and shows a longitudinal section along the axis direction of the main flow pipe. Referring to FIG. 17, within a divided flow pipe 162, a divided flow pipe passage curved approximately in Ω-shape form is formed by a inlet plate 164 extending in a direction approximately orthogonal to the main flow pipe 1 pipe axis direction. In both ends of an outer wall 163 of the divided flow pipe 162, there are oppositely formed an inlet port 165 and an outlet port 166 opening in a face approximately orthogonal to the main flow M. Further, within the divided flow pipe 162, by a curved partition 167 there are formed plural branch flow passages 168a, 168b mutually branching and joining. Inside both end portions of the outer wall 163 (in the vicinity of the inlet port 165 and the outlet port 166), undulation portions 172, 173 are respectively formed so as to respectively clog an inlet and an outlet of the outer peripheral side branch flow passages 168a. By the undulation portions 172, 173, throttles are formed respectively in a flow passage between the inlet port 165 and the inlet of the outer peripheral side branch flow passages 168a, and a flow passage between the outlet port 166 and the outlet of the outer peripheral side branch flow passages 168a. Both sides of one end of the inlet plate 164 are respectively enlarged toward the inlet port 165 and the outlet port 166, and a bypass flow passage 174 shirt-circuiting between the inlet port 165 and the outlet port 166 is formed between this enlarged portion and a top outer wall 169 opposite to a bottom face of the enlarged portion. In an outer wall 163 bottom portion of the divided flow pipe 162, a detection element 171 is attached through a base plate 170. Further, inside the outer wall 163, protuberances 163a, 163b are formed so as to put the detection element 171 between them on its both sides. In an intermediate portion of the partition 167, a protrusion portion 167a protruding toward a detection face of the detection element 171 is formed. By such a flow passage structure, the down flow DW obliquely flowing toward the detection face of the detection element 171 is formed.

Figure 18:
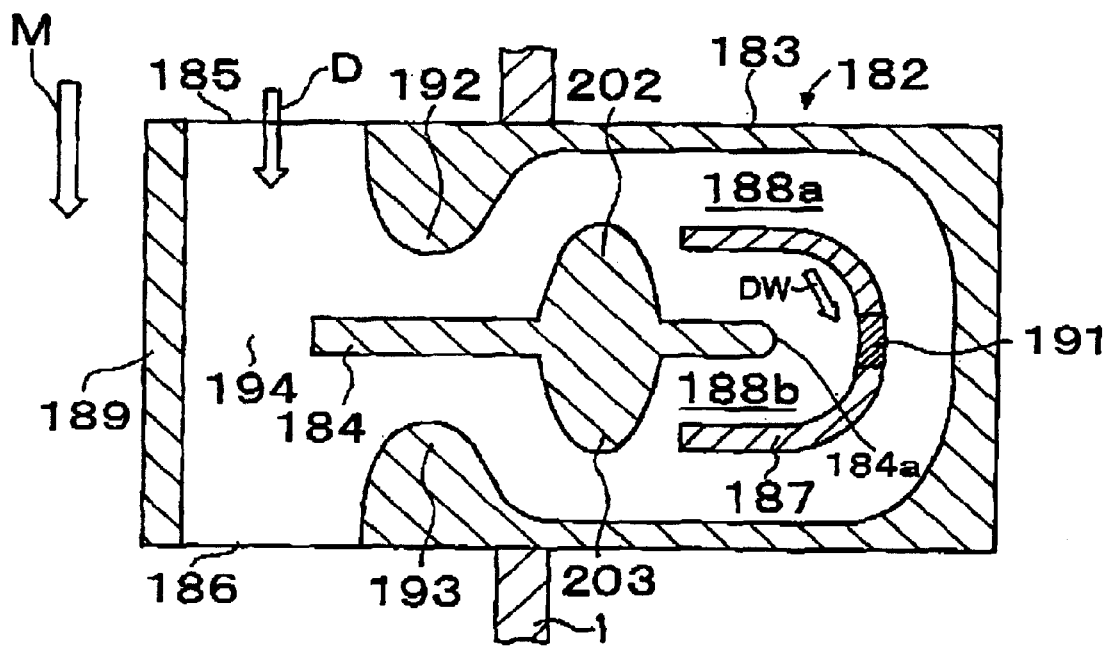
FIG. 18 is an explanatory view of a measurement device of an Embodiment 14 of the invention, and shows a longitudinal section along the axis direction of the main flow pipe.

FIG. 18 is an explanatory view of the measurement device of an Embodiment 14 of the invention, and shows a longitudinal section along the axis direction of the main flow pipe. Referring to FIG. 18, within a divided flow pipe 182, a divided flow pipe passage curved approximately in Ω-shape form is formed by a inlet plate 184 extending in a direction approximately orthogonal to the main flow pipe 1 pipe axis direction. In both ends of an outer wall 183 of the divided flow pipe 182, there are oppositely formed an inlet port 185 and an outlet port 186 opening in a face approximately orthogonal to the flow direction of the main flow M. Further, within the divided flow pipe 182, by a curved partition 187 there are formed plural branch flow passages 188a, 188b mutually branching and joining. Inside both end portions of the outer wall 183 (in the vicinity of the inlet port 185 and the outlet port 186), undulation portions 192, 193 are respectively formed so as to respectively clog an inlet and an outlet of the outer peripheral side branch flow passages 188a. On both sides of an intermediate portion of the inlet plate 184, there are respectively formed undulation portions 202, 203 respectively protruding toward an inside of the outer wall 183. By the undulation portions 192, 202, 193, 203, throttles are formed stepwise in a flow passage between the inlet port 185 and the inlet of the inner peripheral side branch flow passage 188b and a flow passage between the outlet port 186 and the outlet of the inner peripheral side branch flow passage 188b, respectively. A bypass flow passage 194 short-circuiting between the inlet port 185 and the outlet port 186 is formed between one end of the inlet plate 184 and a top outer wall 189 opposite to the one end. In a curved portion of the partition 187, a detection element 191 is attached such that its detection face is exposed to the flow in the inner peripheral side branch flow passage 188b. In the other end of the inlet plate 184, a curved face protrusion portion 184a protruding toward a detection face of the detection element 191 is formed. By such a flow passage structure, the down flow DW obliquely flowing toward the detection face of the detection element 191 is formed.

Figure 19:
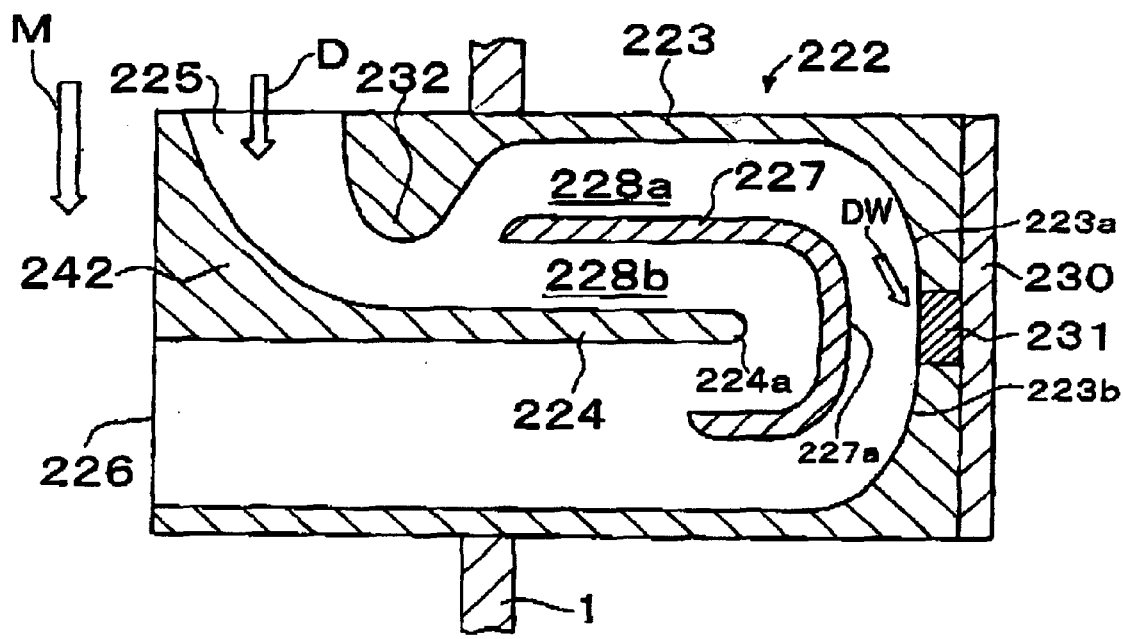
FIG. 19 is an explanatory view of a measurement device of an Embodiment 15 of the invention, and shows a longitudinal section along the axis direction of the main flow pipe.

FIG. 19 is an explanatory view of the measurement device of an Embodiment 15 of the invention, and shows a longitudinal section along the axis direction of the main flow pipe. Referring to FIG. 19, within a divided flow pipe 222, a divided flow pipe passage curved approximately in Ω-shape form is formed by a inlet plate 224 extending in a direction approximately orthogonal to the flow direction of the main flow M. In an outer wall 223 of the divided flow pipe 222, there is formed an inlet port 225 opening in a face approximately orthogonal to the flow direction of the main flow M and, in a top outer wall of the divided flow pipe 222, there is formed an outlet port 226 opening in a face approximately parallel to the flow direction of the main flow M. Further, within the divided flow pipe 222, by a curved partition 227 there are formed plural branch flow passages 228a, 228b mutually branching and joining. The other end of the outlet port 226 side of the partition 227 is largely spaced from the outlet port 226 in comparison with one end of the inlet port 225 side of the same. In the vicinity of the inlet port 225 in the outer wall 223 inside, an undulation portion 232 is formed so as to clog an inlet of the outer peripheral side branch flow passage 228a. On the other hand, also in the vicinity of the inlet port 225 of the inlet plate 224, an undulation portion 242 is formed. By the undulation portions 232, 242, a throttle is formed in a flow passage between the inlet port 225 and an inlet of the branch flow passage 228a. In an outer wall 223 bottom portion of the divided flow pipe 222, a detection element 231 is attached through a base plate 230. Further, inside the outer wall 223, protuberances 223a, 223b are formed so as to put the detection element 231 between them on its both sides. In an intermediate portion of the partition 227, a protrusion portion 227a protruding toward a detection face of the detection element 231 is formed. By such a flow passage structure, the down flow DW obliquely flowing toward the detection face of the detection element 231 is formed.

Figure 20:
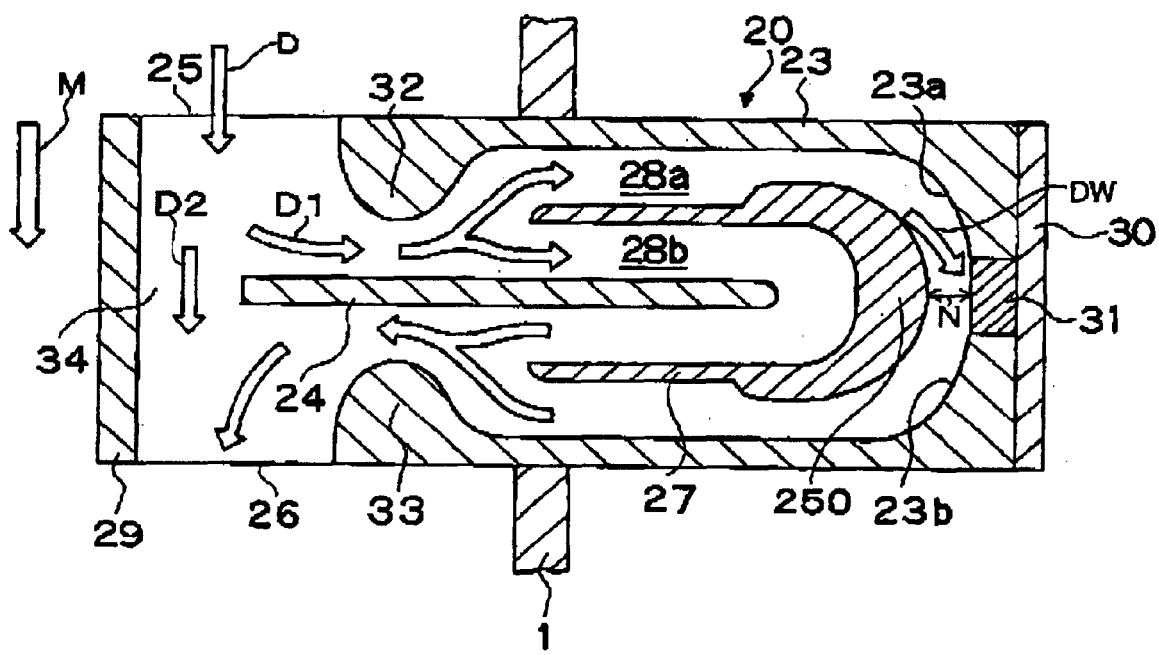
FIG. 20 is an explanatory view of a measurement device of an Embodiment 16 of the invention, and shows a longitudinal section along the axis direction of the main flow pipe.

FIG. 20 is an explanatory view of the measurement device of an Embodiment 16 of the invention. Incidentally, this Embodiment 16 is a modification example of the Embodiment 5, so that in this Embodiment 16 the same reference signs as the Embodiment 5 are given to elements similar to the Embodiment 5. Further, in the following explanations of this Embodiment 16, as to portions in which the measurement device of this Embodiment 16 has constitutions and functions similar to the measurement device of the Embodiment 5, it is construed that the explanations of the Embodiment 5 can be suitably referred.

Referring to FIG. 20, on a wall face of the partition 27 opposite to the detection element 31, a Venturi (Venturi wall portion) 250 is provided from the upstream to the down stream of the detection element 31. By this Venturi 250, a flow passage of the outer peripheral side branch flow passage 28a in which the detection element 31 is disposed is made narrowest in the vicinity of a center of the detection element 31 (this is referred to as "narrowest portion N"). By such a flow passage structure, a turbulence of the flow on the detection face of the detection element 31 is suppressed and, further, such a flow as obliquely impinging against the detection face of the detection element 31 is strongly and stably formed, so that a detection accuracy is improved.

Figure 21:
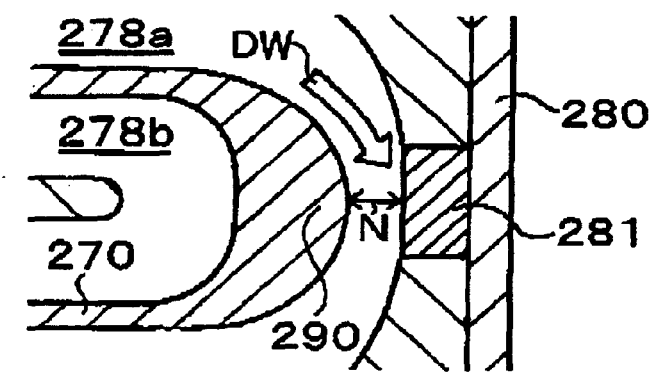
FIG. 21 is an explanatory view of a measurement device of an Embodiment 17 of the invention, and is a partial enlarged view of a detection element vicinity.

FIG. 21 is an explanatory view of the measurement device of an Embodiment 17 of the invention, and is an enlarged view in the vicinity of the detection element. Incidentally, this Embodiment 17 is a modification example of the Embodiment 16, so that portions in which there are differences between the measurement devices of this Embodiment 17 and the Embodiment 16 are explained in the following explanations and, as to portions in which both have similar constitutions and functions, it is construed that the explanations of the Embodiment 16 can be suitably referred.

Referring to FIG. 21, by a partition 270, within the divided flow pipe there are formed an outer peripheral side branch flow passage 278a and an inner peripheral side branch flow passage 278b. In a bottom wall of the divided flow pipe, a detection element 281 is attached through a base plate 280 and exposed to the flow in the outer peripheral side branch flow passage 278a. On a wall face of the partition 270 opposite to the detection element 281, a Venturi 290 is provided from the upstream to the down stream of the detection element 281. By this Venturi 290, a flow passage of the outer peripheral side branch flow passage 278a in which the detection element 281 is disposed is made narrowest in the vicinity of a center of the detection element 281 (this is referred to as "narrowest portion N"). Further, between a flow passage face of the partition 270 in a left and right direction in FIG. 21 (flow passage face in a direction orthogonal to the main flow M (refer to FIG. 20)) and a flow passage face on the Venturi 290, it changes smoothly.

According to the invention, there is provided a measurement device concerning a flow, in which an accumulation of pollution substance on to a detection element is prevented. Further, according to the invention, there is provided a measurement device concerning a flow, which can measure a reverse flow similarly to a normal flow.

The divided flow pipe passage is described herein as being curved in a substantially Ω-shape form. It is, of course, to be understood that various forms, for example, U-shapes, or shapes with asymmetry between the two sides of the shape, or the shapes of passages as illustrated in any of the accompanying Figures, are within the definition of substantially Ω-shape form.

Furthermore, while the invention has been described in detail and with reference to specific embodiments thereof, it will be apparent to one skilled in the art that various changes and modifications can be made therein without departing from the spirit and scope thereof.

This application is based on Japanese Patent Application No. Hei. 11-285650 filed Oct. 6, 1999, which is incorporated herein by reference in its entirety.

What is claimed is:

1. A flow measurement device comprising:

a divided flow pipe which has a divided flow pipe passage in a curved, substantially Ω-shape form, and into which at least a portion of a flow in a main flow pipe, which flow is the object of the measurement, is to be introduced;

an inlet plate forming the curved divided flow pipe passage provided in the divided flow pipe;

a partition formed in the divided flow pipe;

plural branch flow passages defined by and arranged on opposite sides of the partition so as to mutually branch and join in the divided flow pipe; and a detection element which is disposed so as to be exposed to a flow in one of said plural branch flow passages, for detecting a quantity concerning the flow.

2. The flow measurement device as claimed in claim 1, further comprising:

an inlet port of the divided flow pipe, which is formed in an outer peripheral side of the divided flow pipe passage, and which opens in a face arranged to be approximately orthogonal to a flow direction in the main flow pipe, and wherein said detection element is disposed so as to be exposed to a flow in the branch flow passage formed in the outer peripheral side of the divided flow pipe.

3. The flow measurement device as claimed in claim 2, further characterized in that the inlet port of the divided flow pipe and an inlet of the outer peripheral side branch flow passage in which the detection element is disposed are opened in substantially mutually orthogonal faces, and the flow introduced into the divided flow pipe is changed in its direction and flows into the branch flow passage.

4. The flow measurement device as claimed in claim 2, further characterized in that:
an end portion of the partition is above the inlet port of the divided flow pipe; and
an inlet of at least the outer peripheral side branch flow passage opens above the inlet port of the divided flow pipe.

5. The flow measurement device as claimed in claim 2, further characterized in that a throttle is formed in a flow passage between the inlet port of the divided flow pipe and an inlet of a said branch flow passage.

6. The flow measurement device as claimed in claim 5, further characterized in that:
the throttle is defined by at least one undulation portion formed in either one or more of:
an outer wall inside of the divided flow pipe; the partition; aid the inlet plate.

7. The flow measurement device as claimed in claim 6, further characterized in that the undulation portion protrudes from the outer wall inside of the divided flow pipe or from the inlet plate, in the vicinity of said inlet of said branch flow passage, and that the apex of the undulation portion protrudes at least as far as the level of the partition.

8. The flow measurement device as claimed in claim 1, further characterized in that:
an inlet plate forming the curved divided flow pipe passage is provided in the divided flow pipe; and
below the inlet port of the divided flow pipe, an inner peripheral side flow passage wall forming the divided flow pipe passage undulates and a flow passage face of concave curved face form is formed.

9. The flow measurement device as claimed in claim 1, further characterized in that the divided flow pipe has a flow passage structure substantially symmetrical with respect to the detection element.

10. The flow measurement device as claimed in claim 1, further characterized in that a throttle is formed in a flow passage between an outlet port of the divided flow pipe and an outlet of a branch flow passage.

11. The flow measurement device as claimed in claim 10, further characterized in that:
an inlet plate forming the curved divided flow pipe passage is provided in the divided flow pipe; and
the throttle is defined by at least one undulation portion formed in either one or more of: an outer wall inside of the divided flow pipe; the partition; and the inlet plate.

12. The flow measurement device as claimed in claim 11, further characterized in that the undulation portion protrudes from the outer wall inside of the divided flow pipe or from the inlet plate, in the vicinity of the outlet of said branch flow passage, and that the apex of the undulation portion protrudes at least as far as the level of the partition.

13. The flow measurement device as claimed in claim 2, further characterized in that:
in an outer peripheral side of the divided flow pipe passage, an outlet port of the divided flow pipe is formed so as to open in a face approximately orthogonal to the flow direction in the main flow pipe, while being opposed to the inlet port of the divided flow pipe;
an inlet plate forming the curved divided flow pipe passage is provided in the divided flow pipe; and
a bypass flow passage short-circuiting between the inlet port and the outlet port of the divided flow pipe is formed between one end of the inlet plate and a top outer wall of the divided flow pipe.

14. The flow measurement device as claimed in claim 13, further characterized in that:
an orifice is provided in the bypass flow passage; and
a flow rate of a measurement fluid toward the detection element is set by a protrusion amount of a flow passage wall forming the orifice or by the orifice open area.

15. The flow measurement device as claimed in claim 14, further characterized in that the flow passage wall forming the orifice is protruded toward an orifice center, and a sectional shape of a flow passage face of the protruded portion is any one of a polygonal face, a curved face and a duplex curved face.

16. The flow measurement device as claimed in claim 1, further characterized by having flow control means provided in the branch flow passage in which the detection element is disposed and forming such a flow as obliquely impinges against a detection face of the detection element.

17. The flow measurement device as claimed in claim 1, further characterized in that, on a wall face of the partition opposite to the detection element, a Venturi is provided from upstream to downstream of the detection element, and a flow passage of the branch flow passage in which the detection element is disposed is made narrowest in the vicinity of a center of the of the detection element by the Venturi.

18. The flow measurement device claimed in claim 1,
wherein said detection element is disposed so as to be exposed to a flow in a branch flow passage formed in an inner peripheral side or an intermediate portion of the divided flow pipe; and
further comprising a throttle formed in a flow passage between an inlet port of the divided flow pipe and an inlet of the branch flow passage in which a detection face of the detection element is exposed to the flow therein.

19. The flow measurement device as claimed in claim 18, further characterized in that the detection element is provided in the partition.

20. The flow measurement device as claimed in claim 1, further comprising:
an inlet port of the divided flow pipe, which is formed in one end outer peripheral side of the divided flow pipe passage, and which opens in a face arranged to he approximately orthogonal to a flow direction in the main flow pipe; and
an outlet port of the divided flow pipe, which is formed in the other end top of the divided flow pipe passage, and opens in a face approximately parallel to a flow direction in the main flow pipe,
wherein said partition formed in the divided flow pipe, has one end which extends to a vicinity of the inlet port, and has another end which extends while being spaced from the outlet port; and
wherein said detection element is disposed so as to be exposed to a flow in the branch flow passage formed in an outer peripheral side of the divided flow pipe.

21. The flow measurement device as claimed in claim 20, further characterized in that:

an inlet plate forming the curved divided flow pipe passage is provided in the divided flow pipe; and in the vicinity of the inlet port of the divided flow pipe, at least one undulation portion is formed in either one or more of: an outer wall inside of the divided flow pipe; the partition; and the inlet plate, and by the or each undulation portion a throttle is formed in a flow passage between the inlet port of the divided flow pipe and an inlet of the outer peripheral side branch flow passage.

22. The flow measurement device as claimed in claim 1, further comprising:

an inlet port of the divided flow pipe and an inlet of the branch flow passage, which are mutually formed such that the flow introduced into the divided flow pipe is changed in its direction when flowing into the branch flow passage in which the detection element is exposed to the flow therein.

23. The flow measurement device as claimed in claim 1, further comprising:

a throttle formed in a flow passage between an inlet port of the divided flow pipe and an inlet of the branch flow passage such that the flow introduced into the divided flow pipe is changed in its direction when flowing into the branch flow passage in which the detection element is exposed to the flow therein.

24. The flow measurement device as claimed in claim 1, further comprising:

an inlet port of the divided flow pipe, which is formed in one end outer peripheral side of the divided flow pipe passage, and which opens in a face arranged to be approximately orthogonal to a flow direction in the main flow pipe;

an outlet port of the divided flow pipe, which is formed in the other end outer peripheral side of the divided flow pipe passage, and which opens in a face arranged to be approximately orthogonal to a flow direction in the main flow pipe;

throttles formed respectively in a flow passage between the inlet port of the divided flow pipe and an inlet of the outer peripheral side branch flow passage and a flow passage between the outlet port of the divided flow pipe and an outlet of the outer peripheral side branch flow passage, wherein said detection element is disposed so as to be exposed to a flow in the branch flow passage formed in an outer peripheral side of the divided flow pipe; and a Venturi provided, on a wall face of the partition opposite to the detection element and from an upstream to a downstream of the detection element, such that a flow passage of the branch flow passage in which the detection element is disposed is made narrowest in the vicinity of a center of the detection element.

25. The flow measurement device as claimed in claim 1, for installation in an intake system of an internal combustion engine mounted on a vehicle.

* * * * *